United States Patent [19]

Yong et al.

[11] Patent Number: 5,809,296

[45] Date of Patent: Sep. 15, 1998

[54] METHOD AND STRUCTURE FOR CLUSTERING DATABASE TABLES INTO CLASSES AND PRESENTING EACH CLASS AS AN E-R MODEL

[75] Inventors: Dennis Yong; Viktor Choong-Hung Cheng; Liat Lim; Siew Choon Tay, all of Singapore, Singapore

[73] Assignee: St Computer Systems & Services Ltd., Singapore

[21] Appl. No.: 346,510

[22] Filed: Nov. 29, 1994

[51] Int. Cl.$^6$ ....................................................... G06F 17/30
[52] U.S. Cl. ............................................. 395/612; 395/613
[58] Field of Search ..................................... 395/600, 700, 395/650, 500, 613, 612; 364/200

[56] References Cited

U.S. PATENT DOCUMENTS

| | | | |
|---|---|---|---|
| 4,815,005 | 3/1989 | Oyanagi | 395/63 |
| 4,982,340 | 1/1991 | Oyanagi | 395/63 |
| 5,010,478 | 4/1991 | Deran | 364/200 |
| 5,043,929 | 8/1991 | Kramer | 364/578 |
| 5,072,406 | 12/1991 | Ammon | 395/64 |
| 5,123,103 | 6/1992 | Ohtaki | 395/605 |
| 5,193,185 | 3/1993 | Lanter | 395/612 |
| 5,224,206 | 6/1993 | Simoudis | 395/77 |
| 5,235,465 | 8/1993 | Hung et al. | 395/63 |
| 5,235,701 | 8/1993 | Ohler et al. | 395/600 |
| 5,261,080 | 11/1993 | Khoyi et al. | 395/500 |
| 5,295,261 | 3/1994 | Simonetti | 395/600 |
| 5,303,379 | 4/1994 | Khoyi et al. | 395/700 |
| 5,325,465 | 6/1994 | Hung et al. | 395/63 |
| 5,421,015 | 5/1995 | Khoyi et al. | 395/650 |
| 5,487,135 | 1/1996 | Freeman | 395/75 |

(List continued on next page.)

FOREIGN PATENT DOCUMENTS

| | | |
|---|---|---|
| 0 268 367 A2 | 5/1988 | European Pat. Off. . |
| 0 589 070 A1 | 3/1994 | European Pat. Off. . |
| A1 589070 | 3/1994 | European Pat. Off. . |
| 0 615 198 A1 | 9/1994 | European Pat. Off. . |
| A1 615198 | 9/1994 | European Pat. Off. . |
| 2-141 828 | 8/1990 | Japan . |

OTHER PUBLICATIONS

Kroenke, Business Modeling with Semantic Objects, Wall Data Inc, pp. 1–4, Dec. 1994.

A Survey of the Universal Relation Model, Leymann, Data & Knowledge Engineering, vol. 4, 1989, pp. 305–320.

The Universal Relation as a user Interface, Ullinson, Principles of Database and Knowledge Based Systems, vol. II, Chpater 17, 1989.

Consequences of Assuming a Universal Relation, W. Kent, 1981 ACM Transactions on Database Systems, vol. 6, No. 4, pp. 539–556.

EasyTalk Product Backgrounder from Intelligent Business Systems Brochure pertaining to Software Interfaces product.

(List continued on next page.)

Primary Examiner—Thomas G. Black
Assistant Examiner—Frantz Coby
Attorney, Agent, or Firm—Flehr Hohbach Test Albritton & Herbert LLP; Steven F. Caserza

[57] ABSTRACT

A reverse engineering technology is capable of automatically reversing from a physical data model comprising a relational or 4GL data model of an existing application database into a logical data model comprising classes and an entity-relationship (E-R) model of each class, the classes representing the different types of high-level objects that make up the application. This logical data model allows users to have a much clearer understanding of their application database thereby increasing their productivity and ease of maintenance of their existing applications. This is made possible by the method and structure of this invention first capturing the application semantics from the physical data model to provide a set of derived semantics. The derived semantics are then used to identify classes and derive the class definitions which are then used to derive the E-R model of each class. In addition, the derived semantics can be easily updated by the method and structure of this invention when the physical data model is changed.

34 Claims, 16 Drawing Sheets

U.S. PATENT DOCUMENTS

| | | | |
|---|---|---|---|
| 5,499,371 | 3/1996 | Henninger et al. | 395/700 |
| 5,535,325 | 7/1996 | Catell et al. | 396/161 |
| 5,548,749 | 8/1996 | Kroenke et al. | 395/600 |
| 5,566,333 | 10/1996 | Olson et al. | 395/611 |
| 5,596,746 | 1/1997 | Shen et al. | 395/612 |
| 5,600,831 | 2/1997 | Levy et al. | 395/602 |
| 5,627,979 | 5/1997 | Chang et al. | 395/335 |
| 5,640,559 | 6/1997 | Silberbauer et al. | 395/612 |
| 5,655,116 | 8/1997 | Kirk et al. | 395/601 |

OTHER PUBLICATIONS

Premerlani, William, J., Blaha, Michael R., "An Approach for Reverse Engineering of Relational Databases". Communications of the ACM, May 1994, vol. 37, No. 5, pp. 42–49, especially pp. 48, 49, step 1–7.

Patent Abstracts of Japan, vol. 14, No. 381 (P–1093), 1990, JP 2–141 828 (Hitachi).

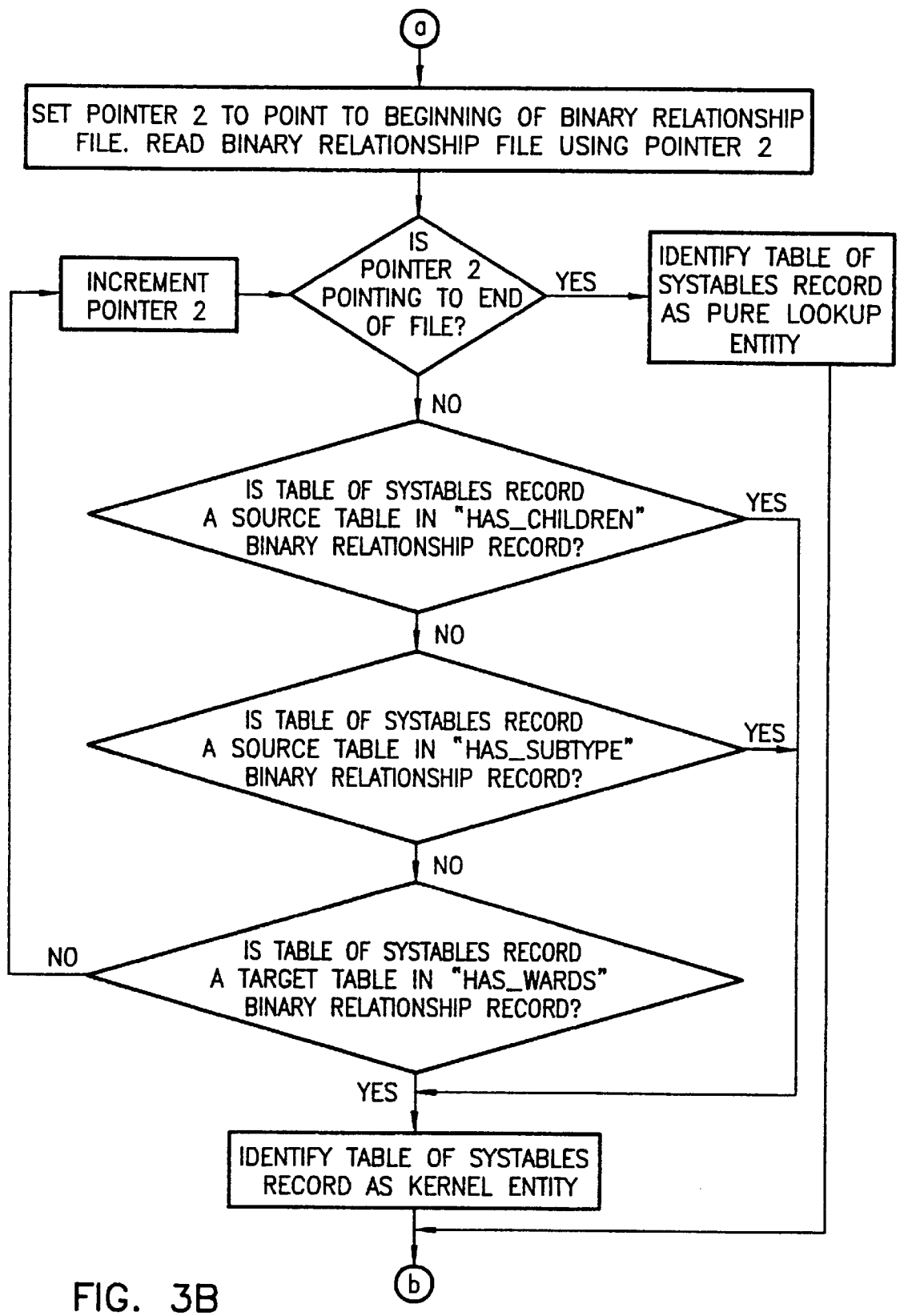
FIG. 3B
(CONTINUED FROM PREVIOUS PAGE)

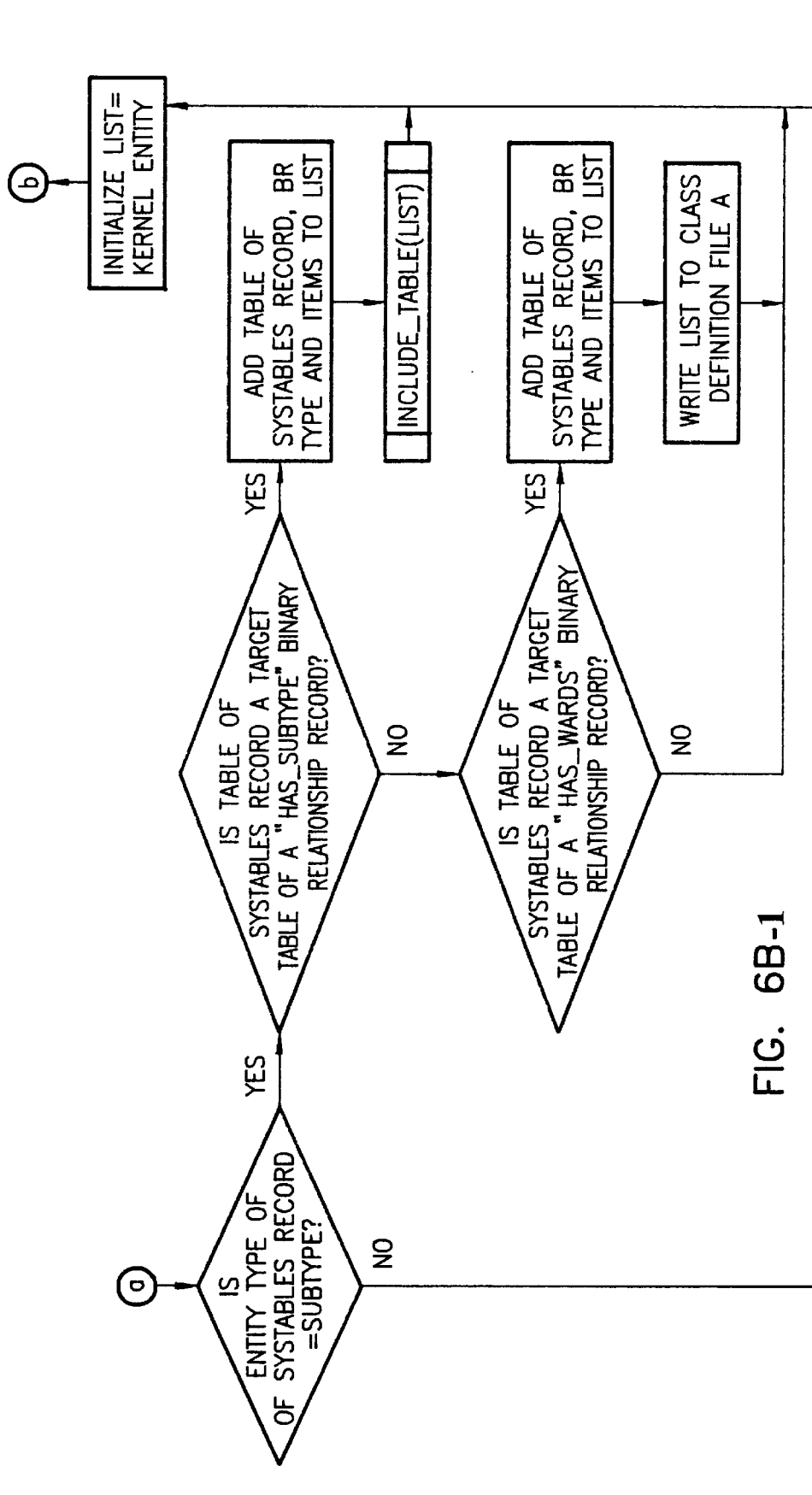

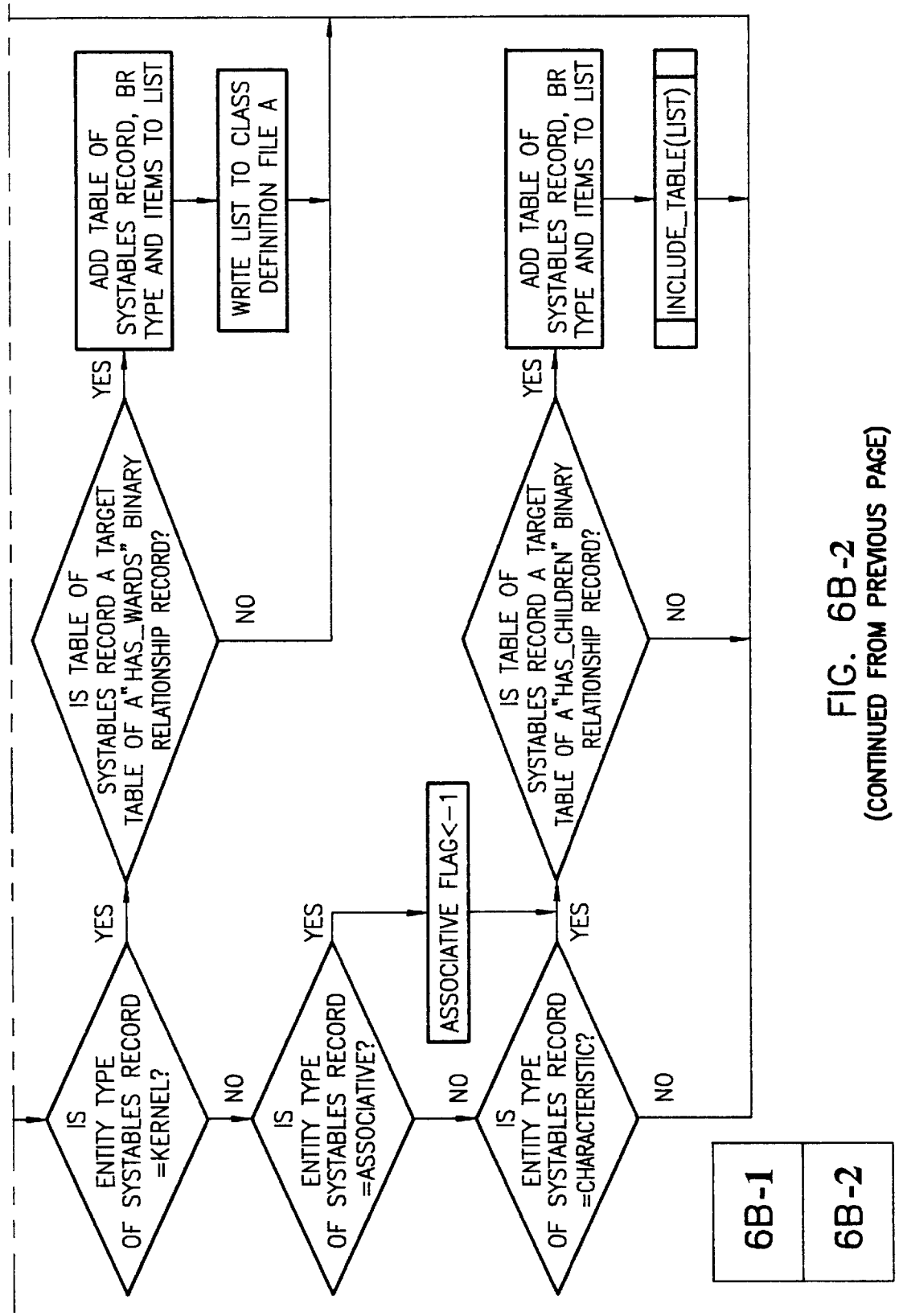
FIG. 6B-2
(CONTINUED FROM PREVIOUS PAGE)

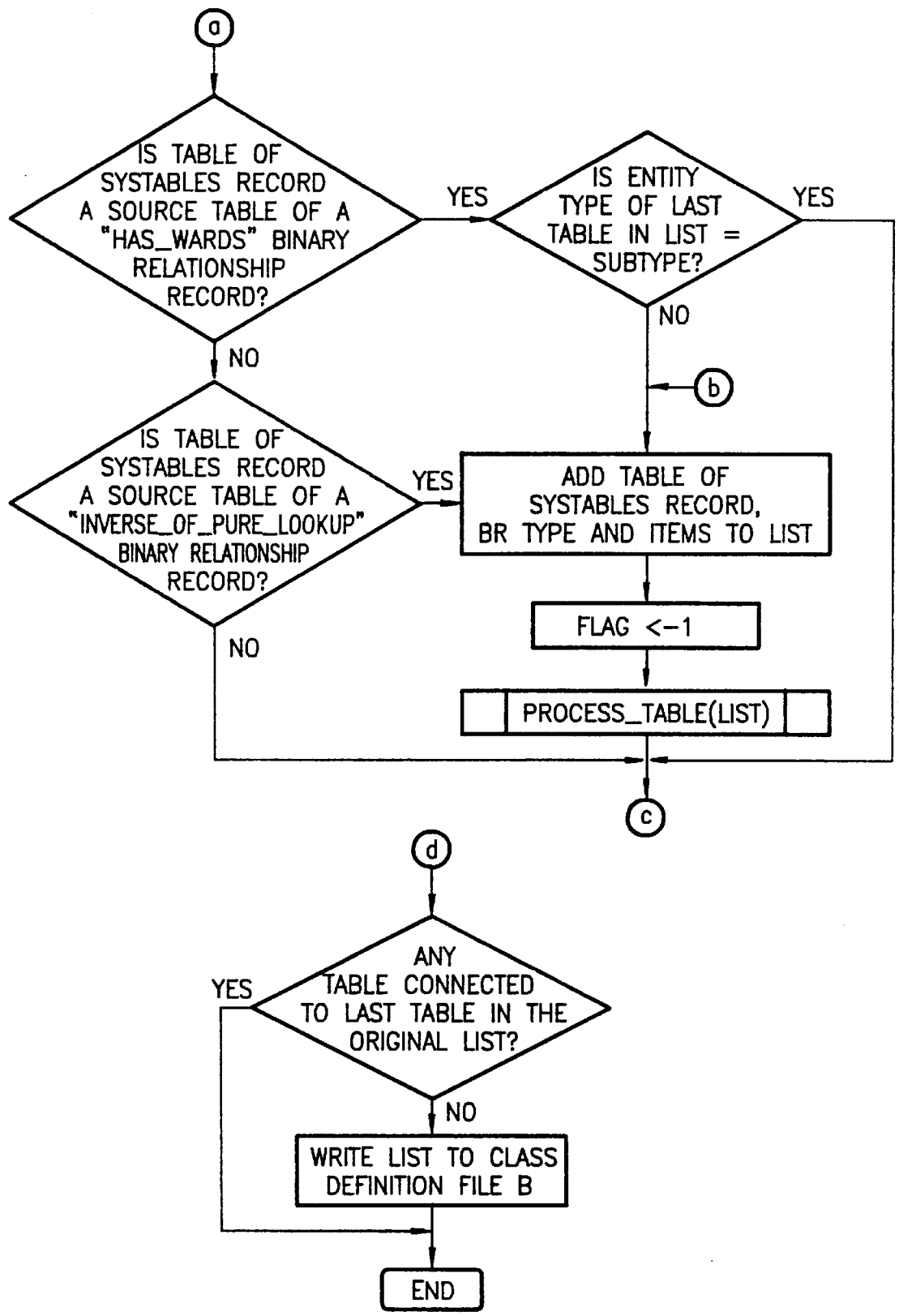
FIG. 9B (CONTINUED FROM PREVIOUS PAGE)

METHOD AND STRUCTURE FOR CLUSTERING DATABASE TABLES INTO CLASSES AND PRESENTING EACH CLASS AS AN E-R MODEL

INTRODUCTION

1. Technical Field

This invention pertains to reverse engineering technology and more specifically to a method and system of reverse engineering from a physical data model comprising a relational or 4GL data model of an existing application into a logical data model comprising classes and an entity-relationship (E-R) model of each class, the classes representing the different types of high-level objects that make up the application.

2. Background

This invention introduces a novel way of reverse engineering from a physical data model to a logical data model. Current techniques of reverse engineering from relational or 4GL data model of an application create a single E-R model that represents the whole application. However, an application is usually about different types of high-level objects, such as employees, projects, customers, orders, etc.; each of these types of objects is called a class. Highlighting these classes helps a user to easily understand their application especially when it is complex. But it is not always obvious by looking at this single E-R model of the whole application what these classes are and which entities in this single E-R model make up each of these classes.

SUMMARY

This invention provides a method and system in which the relational or 4GL data model of an application is reverse engineered first into classes and then into an E-R model for each class. This set of E-R models of classes then represent the logical data model of the application. In accordance with the teachings of this invention, it has been determined that there would be great usefulness in providing such a reverse engineering technology, which allows users to obtain a better understanding of the database to help formulate queries of the database and to help enhance their applications. This invention uses an existing database system catalog or data dictionary to derive the application semantics and then use the derived semantics to derive classes and their E-R models. In addition, the derived semantics, the classes, and their E-R models can easily be updated by this method and system when the database data dictionary or system catalog is changed.

BRIEF DESCRIPTION OF THE DRAWING

FIG. 3a and 3b form a flowchart depicting one embodiment of a procedure to identify kernel entities and pure lookup entities suitable for use in the step of Identify Entity Type of Each File 23 in embodiment of the FIG. 2.

FIGS. 6A, 6B-1 and 6B-2 form a flow chart depicting one embodiment of a procedure to generate Class Definition File A suitable for use in the step of derive Class Definition in the embodiment of FIG. 1.

FIGS. 9A-1, 9A-2 and 9B form a flowchart depicting one embodiment of the Process_Table procedure used by the procedure of FIG. 8.

DETAILED DESCRIPTION

Overview

The following describes an embodiment of this invention for relational database systems using the SQL language interface. However, it is to be understood that the teachings of this invention are equally applicable to other database systems using a 4GL language interface.

Figure 1:
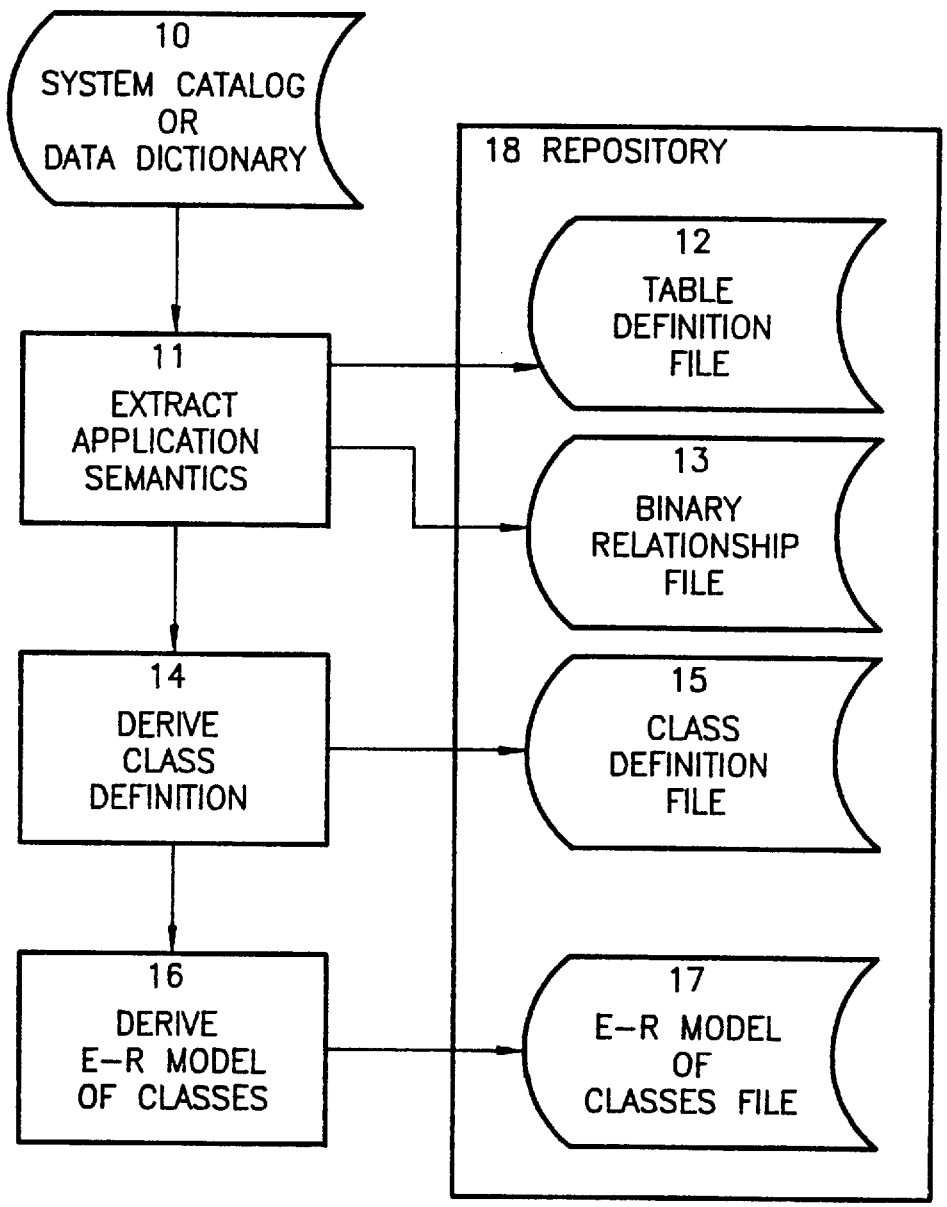
FIG. 1 is a main flowchart depicting one embodiment of a method and structure of deriving classes and their E-R models in accordance with the teachings of this invention.

FIG. 1 depicts the operation of and interaction between the following modules:

Extract Application Semantics

Derive Class Definitions

Derive E-R Model of Classes

Extract Application Semantics

Figure 2:
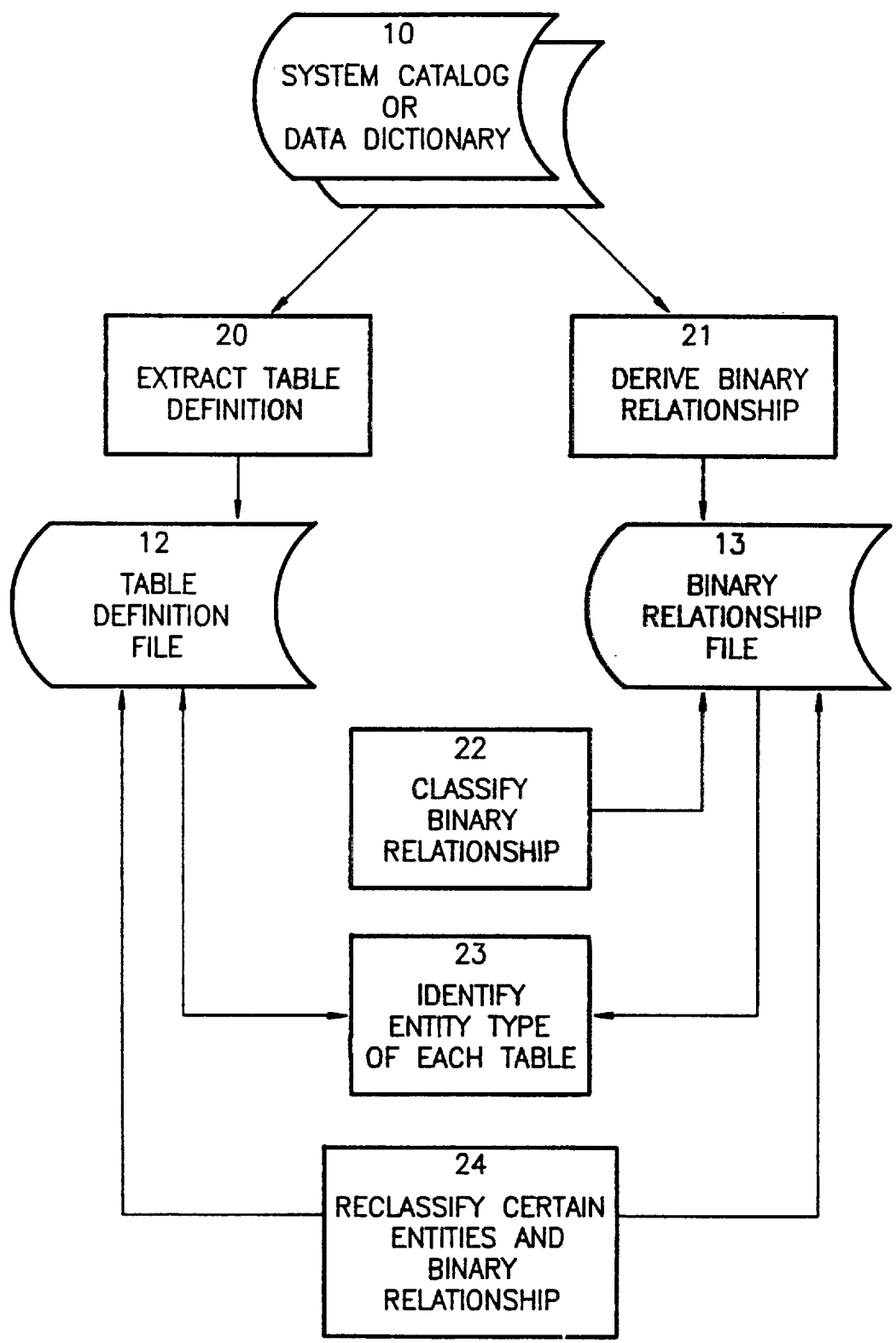
FIG. 2 is a flowchart depicting one embodiment of a procedure to extract application semantics from the System Catalog or Data Dictionary, suitable for use with the method and structure of FIG. 1.

As shown in FIG. 2, in one embodiment Extract Application Semantics procedure 11 includes the following steps:

Extract Table Definitions

Derive Binary Relationships

Classify Binary Relationships

Identify Entity Type of Each Table

Reclassify Certain Entities and Binary Relationships

System Catalog or Data Dictionary 10 of an application is used to extract the necessary semantics of the application for deriving classes and E-R Model of classes of the application. Before we describe in detail the steps involved in this module let us briefly explain what a system catalog typically contains.

System catalog 10 is typically made up of tables just like the tables of the application. However, while the tables of the application store application data, the system catalog tables store definitions of all the application tables including definitions of the columns of each application table as well as the primary and foreign keys, security options, system options, etc. The following are some of the system catalog tables relevant to certain embodiments of this invention:

a. SYSTABLES: This describes each application table in the database. Some of its columns are:

table name or identifier table name table type no of columns it has b. SYSCOLUMNS: This describes each column of an application table in the database. Some of its columns are:

column number column name table identifiers column type c. SYSCONSTRAINTS: This lists the constraints (i.e. the primary and foreign keys) placed on the columns in each database table. Each constraint has it own index and each index is defined by a record in a SYSINDEX table. Some of its columns are:

constraint identifier constraint name table identifier constraint type such as primary or foreign SYSINDEX table name d. SYSINDEX: This table describes the indexes in the database, i.e. what columns of a table that are indexed. These are the columns that make up a primary key or a foreign key listed in the SYSCONSTRAINTS table. Some of the columns of SYSINDEX are:

index name table identifier index type i.e. unique or duplicates a list of column numbers that make up the index.

e. SYSREFERENCES: This tells us the table and its primary key that a foreign key references. Some of the columns of the table are:

constraint identifier constraint identifier of primary key it references table identifier of table it references Let us also explain the meaning of primary and foreign keys as mentioned in the SYSCONSTRAINTS system catalog table above. A primary key is a unique identifier for a table. It is a column or a combination of columns of a table whose values are used to uniquely identify rows of a table such that no two rows have the same primary key values. A foreign key is a column or a combination of columns of a table whose values are required to match those of the primary key of some other table. The following example using SQL show how two tables are defined with primary and foreign keys and stored in the system catalog:

```
CREATE TABLE accounts (
    acc_num INTEGER,
    acc_type INTEGER,
    acc_descr CHAR (20),
    PRIMARY KEY (acc_num, acc_type) )
CREATE TABLE sub_accounts (
    sub_acc INTEGER PRIMARY KEY,
    ref_num INTEGER NOT NULL,
    ref_type INTEGER NOT NULL,
    sub_descr CHAR (20),
    FOREIGN KEY (ref_num, ref_type) REFERENCES
    accounts (acc_num, acc_type))
```

In this example, the foreign key of the sub_accounts table, ref_num and ref type, references the primary key, acc_num and acc_type, in the accounts table. When referencing a primary key in another table, it is not necessary to explicitly state the primary key columns in that table, since the default is that primary key columns. For example, the foreign key of the sub-accounts table above could be stated as:

FOREIGN KEY (ref_num, ref_type) REFERENCES accounts

Notice that (acc_num, acc_type) can be omitted.

Extract Table Definition

The Extract Table Definition module 20 of FIG. 2 extracts the table definition of application database tables contained in System Catalog 10 and stores them in the following files:

SYSTABLES

SYSTABCOLS

SYSTABLES has the following fields:

table name entity type

SYSTABCOLS has the following fields:

table name column name column type (e.g. character, numeric, date)

key type, i.e.:

'O' if column is a non-key

'P' if column is used as primary key only

'F' if column is used as foreign key only

'PF' if column is used as primary and foreign key

As an example of the key type of SYSTABCOLS, consider two tables EMPLOYEE and SKILLS as follows:

| Table Name | Column Name | Keys |
|---|---|---|
| EMPLOYEE | Emp_No | Primary key is Emp_No |
|  | Emp_Name |  |
| SKILLS | Emp_No | Primary key is Emp_No, Skill |
|  | Skill | Foreign key is Emp_No referencing EMPLOYEE |

The keytypes of Emp_No and Emp_Name of EMPLOYEE are P and O, respectively.

The keytypes of Emp_No and Skill of SKILLS are PF and P, respectively.

Derive Binary Relationships

The Derive Binary Relationships module 21 of FIG. 2 derives a binary relationship for each foreign key defined in System Catalog 10. A binary relationship is a linkage between two tables, an example of which is the following:

| Source Table | Source Column | Target Table | Target Column |
|---|---|---|---|
| EMPLOYEE | Emp_No | SKILLS | Emp_No |

This binary relationship is derived from a foreign key in SKILLS table referencing an EMPLOYEE table having Emp_No as its primary key.

Classify Binary Relationships

The Classify Binary Relationships module 22 of FIG. 2 classifies a binary relationship into one of the following types:

has_children has_wards has_subtype

Each of these types can be recognized by examining whether the columns of the foreign key from which a binary relationship is derived are also used as the primary key of the table containing this foreign key.

Consider the following table X with a composite primary key a, b:

| Table | Column |
|---|---|
| X | a |
|   | b |
|   | c |
|   | d |

If table X has a foreign key, the following represent the possible cases in which this foreign key could be formed:

Case A: Using some but not all of the primary key columns, i.e. a or b.

Case B: Using all the primary key columns, i.e. a and b.

Case C: Using none of the primary key columns, i.e. c or d.

Case D: Using a combination of some but not all primary key columns and some non-primary key columns, i.e. ac, ad, bc or bd.

For Case A, if a is the foreign key, the keytype of the columns of table X is as follows:

| Column | Keytype |
|---|---|
| a | PF |
| b | P |
| c | O |
| d | O |

For Case B, the keytype of the columns of table X is as follows:

| Column | Keytype |
|---|---|
| a | PF |
| b | PF |
| c | O |
| d | O |

For Case C, if c is the foreign key, the keytype of the columns of table X is as follows:

| Column | Keytype |
|---|---|
| a | P |
| b | P |
| c | F |
| d | O |

For Case D, if bc is a foreign key, the keytype of the columns of table X is as follows:

| Column | Keytype |
|---|---|
| a | P |
| b | PF |
| c | F |
| d | O |

A "has_children" type of binary relationship corresponds to Case A. An example of Case A is where an EMPLOYEE table has Emp_No as the primary key and another table called SKILLS which contains the skills of every employee. The SKILLS table has a composite primary key comprising Emp_No and Skill and a foreign key Emp_No referencing EMPLOYEE. The name "has_children" is used because EMPLOYEE is not only related to SKILLS but the relationship is one where EMPLOYEE considers SKILLS as its "children". This is because the records of SKILLS can only be created if their corresponding EMPLOYEE record exists.

A "has_subtype" type of binary relationship corresponds to Case B. An example of Case B is where a table called EMPLOYEE has Emp_No as its primary key and two other tables called MONTHLY_RATED_EMP and DAILY_RATED_EMP each has a primary key of Emp_No, and a foreign key is also Emp_No referencing EMPLOYEE. The name "has_subtype" is used to classify the binary relationships between EMPLOYEE and MONTH_RATED_EMP and between EMPLOYEE and DAILY_RATED_EMP because both the MONTHLY_RATED_EMP and DAILY_RATED_EMP are subtypes of EMPLOYEE.

A "has_wards" type of binary relationship corresponds to Case C. An example of Case C is a CUSTOMER table having Cust_No as its primary key and another table called INVOICES having Inv_No as its primary key. INVOICES also has a column called Cust_No used as a foreign key referencing CUSTOMER. The name "has_wards" is used because both tables have their own unique identity through different primary key but CUSTOMER could be regarded as a "guardian" having INVOICES as its "wards" because INVOICES belong to their respective CUSTOMER. Case D is partly a "has_children" and partly a "has_wards" type. However, in this embodiment, we simply assign it a "has_wards" type.

Identify Entity Type of Each Table

In Identify Entity Type of Each Table step 23 of FIG. 2, an application table is classified as one of the following types:

kernel entity characteristic entity associative entity subtype entity pure lookup entity Kernel entities are entities that have independent existence; they are "what the database is really all about". In other words, kernels are entities that are neither characteristic nor associative, e.g. suppliers, parts, employees, orders, etc. are all kernel entities.

A characteristic entity is one whose primary purpose is to describe or "characterize" some other entity. For example, the file SKILLS which contains the SKILLS an employee has is a characteristic entity of the EMPLOYEE entity. Characteristic entities are existence-dependent on the entity they described which can be kernel, characteristic, or associative.

An associative entity is an entity whose function is to represent a many-to-many (or many-to-many-to-many, etc.) relationship among two or more other entities. For example, a shipment is an association between a supplier and a part. The entities associated may each be kernel, characteristic, or associative.

A subtype is a specialization of its supertype. As described earlier, MONTHLY_RATED_EMP and DAILY_RATED_EMP are examples of subtypes of EMPLOYEE.

Lastly, we have entities that look like kernel entities but should not be classified as such because their purpose is solely for lookup of code description.

Figure 3A:
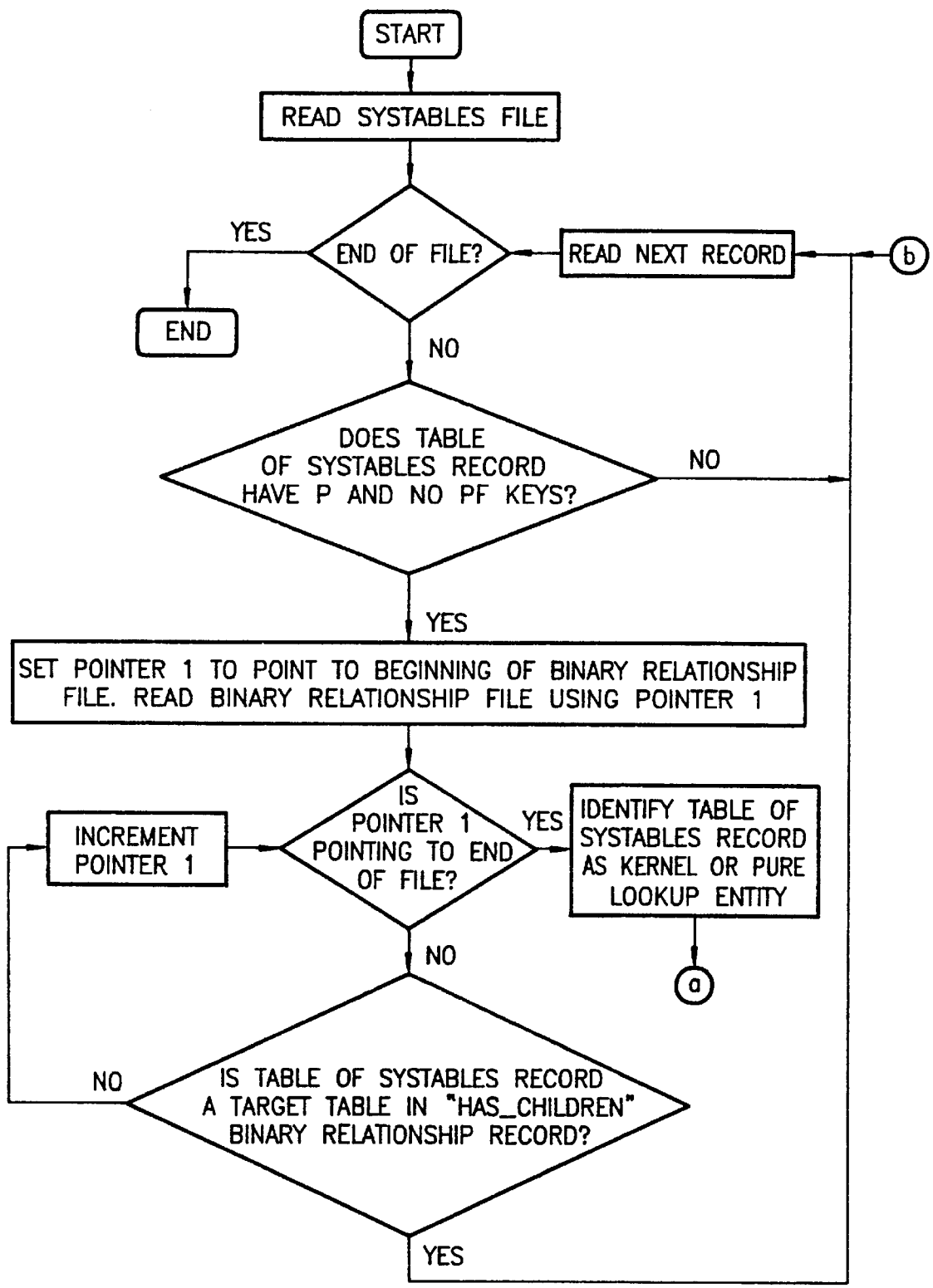

FIGS. 3a and 3b describes one embodiment of a procedure to identify kernel and pure lookup entities suitable for use in the step of Identify Entity Type of Each Table 23 in the embodiment of FIG. 2. It first identifies those tables whose primary key columns are of 'P' keytype only. These tables are either kernel or pure lookup entities. To distinguish between the two, the procedure of FIG. 3 uses the following rule:

1) IF such a table has no "children" or subtype, i.e. it is not a source table in any "has_children" or "has-subtype" binary relationship; and
2) IF it is not a "ward", i.e., it is not a target table in any "has_wards" binary relationship;
3) THEN it is a pure lookup entity;
4) OTHERWISE, it is a kernel entity.

Figure 4A:
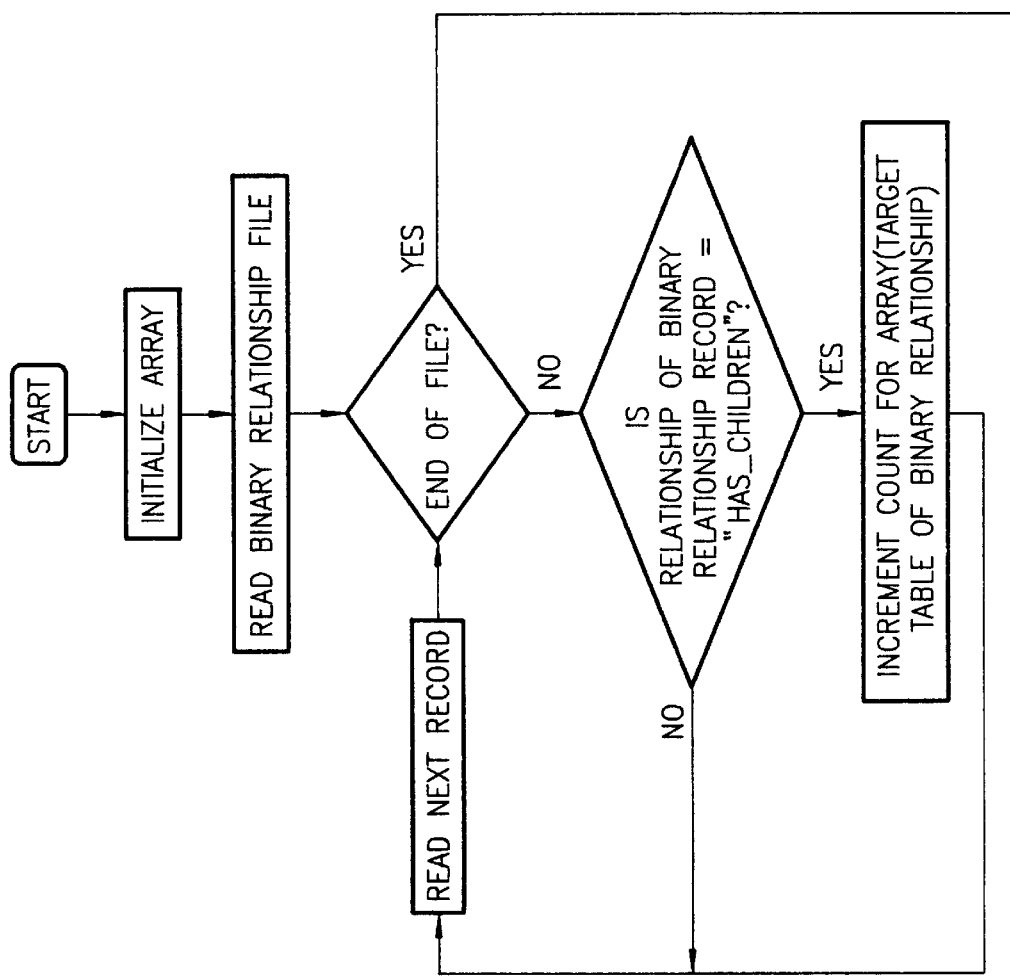
FIGS. 4A and 4B form a flowchart depicting one embodiment of a procedure to identify characteristic and associative tables suitable for use in the step of Identify Entity Type of Each File 23 in embodiment of the FIG. 2.
Figure 4B:
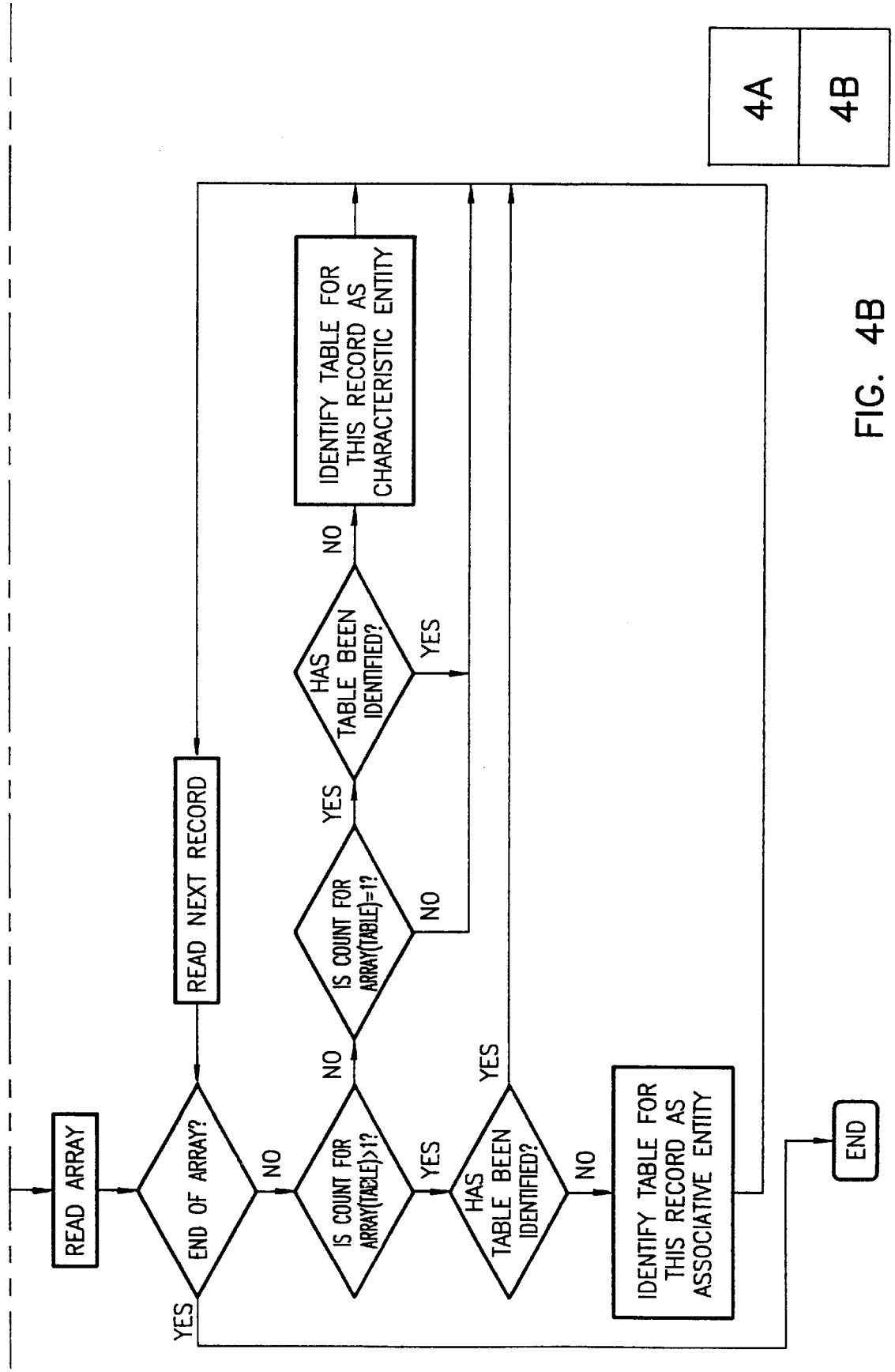

FIGS. 4A and 4B describe one embodiment of a procedure to identify characteristic and associative entities suitable for use in the step of Identify Entity Type of Each Table 23 in the embodiment of FIG. 2. It uses the following rule:

1) IF a table appears more than once as a target file in "has_children" binary relationships, THEN it is an associative entity;
2) IF it appears only once, THEN it is a characteristic entity.

Subtype entities are easily identified as they are the target files in "has_subtype" binary relationships.

Reclassify Certain Entities and Binary Relationships

Even though we have earlier identified some tables as kernel entities, in one embodiment some of these kernel entities are reclassified as pure lookup entities. Consider for example a kernel entity EMPLOYEE having an associative entity LANGUAGE_SPOKEN whose other kernel entity is LANGUAGE. LANGUAGE_SPOKEN has two columns, namely a foreign key called Emp_No referencing EMPLOYEE and another foreign key called Language_Code referencing LANGUAGE. The LANGUAGE table has only two columns, namely Language_Code as its primary key and a non-key column called Language_Desc. Even though we earlier identified LANGUAGE as a kernel entity as it has LANGUAGE_SPOKEN as its "children", in this embodiment LANGUAGE is reclassified as a pure lookup entity since it is used solely by the LANGUAGE_SPOKEN table to obtain the description of the Language_Code.

Figure 5:
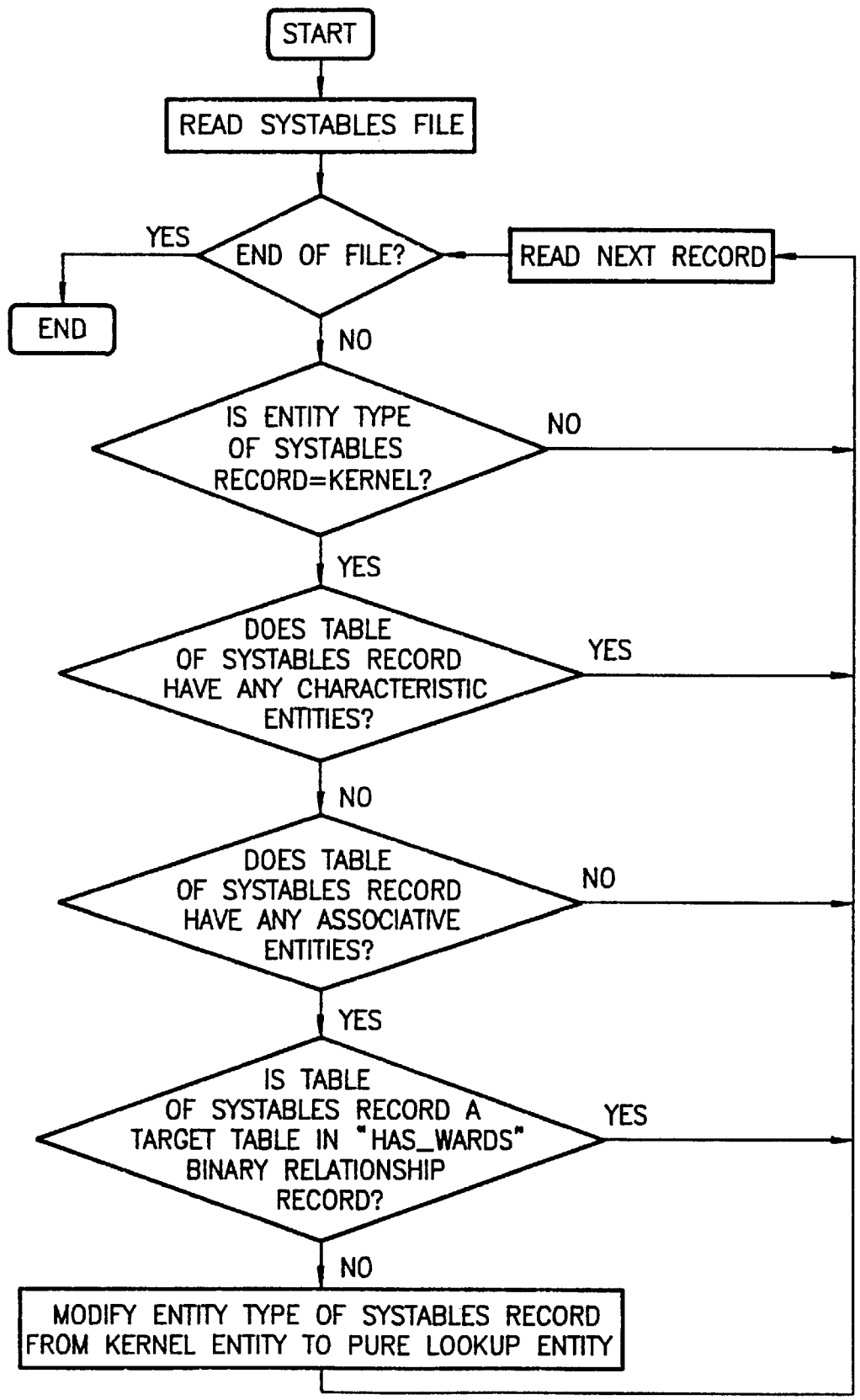
FIG. 5 is a flowchart depicting one embodiment of a procedure to reclassify kernel entities into pure lookup entities suitable for use in the step of reclassify certain entities and binary relationships 24 in the embodiment of FIG. 2.

FIG. 5 describes one embodiment of a procedure to identify these kernel entities and modify them to pure lookup entities, suitable for use in the step of Reclassify Certain Entities and Binary Relationships 24 in the embodiment of FIG. 2. It uses the following rule to do this:

1) IF a kernel entity has only associative entities and no characteristic entities; and
2) IF it is not a target table in any "has_ward" binary relationships;
3) THEN modify the kernel entity into a pure lookup entity and the associative entities of this kernel entity into characteristic entities. Also, modify the associative entities of this kernel entity into characteristic entities if the associative entities has only one other entity that associates it.

Next, we access all those "has_children" and "has_wards" binary relationships whose source table is one of these pure lookup entities. We then modify them into a new type called "inverse_of_pure lookup" type. We use the word "inverse" as the lookup direction is not from source table to target table but the reverse, i.e. from target table to source table.

For every binary relationship in Binary Relationship File 13, an inverse is also created and stored in the Binary Relationship File. For a "has-children" or "has-wards" type, the inverse is called "inverse_of_has_children" or "inverse_of_has_wards", respectively. For an "inverse_of_pure_lookup" type the inverse is called "pure_lookup".

Derive Class Definition 14

This module generates a definition of a class for each kernel entity in the database and stores this definition in a Class Definition File (CDF).

A class is a cluster of tables whose structure is a tree. The root of the tree is a kernel entity which defines the core attributes of the class. The tree has the following main branches:

(i) a branch for each of the subtypes of the root kernel entity
(ii) a branch for each of the "wards" of the root kernel entity
(iii) a branch for each of the characteristic entities of the root kernel entity
(iv) a branch for each of the associative entities of the root kernel entity These branches are derived using the "has_subtype", "has_wards" and "has_children" binary relationships with the root kernel entity being the source table.

Each of the above subtype, characteristic and associative entities could also have their own branches which are their characteristic or associative entities. The latter characteristic or associative entities could also have their own characteristic or associative entities and so forth. These branches are derived using the "has_children" binary relationships with the target files of these binary relationships forming the new branches. The procedure of FIGS. 6A, 6B-1 and 6B-2 together with the sub-procedure Include_Table of FIGS. 7a and 7b are used to derive the above branches which are then stored as a set of lists in Class Definition File A (CDF A). An example of a list is:

Table=EMPLOYEE
Column=Emp_No
Table=BILLINGS
Column=Emp_No
BR Type="has_children"
Column=Proj_No
Table=PROJECTS
Column=Proj_No
BR Type="inverse_of_has_children"

This list contains a table EMPLOYEE linked to a table BILLINGS which is linked to table PROJECTS. The binary relationship (BR) type from EMPLOYEE to BILLINGS is "has_children" using the column Emp_No from both tables and the BR type from BILLINGS to PROJECTS is "inverse_of_has_children" using the column Proj_No from both tables.

Let us now describe how a list in CDF A is produced using this procedure. It starts by initializing a list to the first kernel entity in SYSTABLES. This kernel entity forms the root kernel entity of a class to be generated. Next it looks for a subtype entity of this kernel entity using a sorted SYSTABLES file and the Binary Relationships File 13. This file has been sorted in descending order of subtypes, kernels, associatives, characteristics and pure lookups. If one subtype entity is found, it is added to the list together with the name of the corresponding binary relationship type which in this case is "has_subtype" and the names of the columns used. It then calls on a sub-procedure Include_Table as depicted in FIG. 7a and 7b to find associative and characteristic entities of the subtype entity. If a characteristic entity is found, it is added to the list together with the name of the corresponding binary relationship type which in this case is "has_children" and the names of the columns used. The sub-procedure Include_Table is then called again, this time to find other associative entities or characteristic entities of the characteristic entity. If no such entity can be found the list is then written to the Class Definition File A (CDF A).

Besides these branches, the tree of a class also has what we called "lookup" branches originating from each node in the above branches. These "lookup" branches are derived using the "inverse_of_has_wards" and "pure_lookup" binary relationships with the node being the source table and the target table forming new branches. Furthermore, the new branches could also have their own new "lookup" branches and so forth. These subsequent "lookup" branches are formed using not only the "inverse_of_has_wards" and "pure_lookup" binary relationships but also the "inverse_of_has_children" binary relationships with the target table forming the new "lookup" branches. The procedure of FIG. 8 together with the sub-procedure Process_Table of FIG. 9a and 9b are used to derive these branches which are then stored as a set of lists in Class Definition File B (CDF B).

Figure 8:
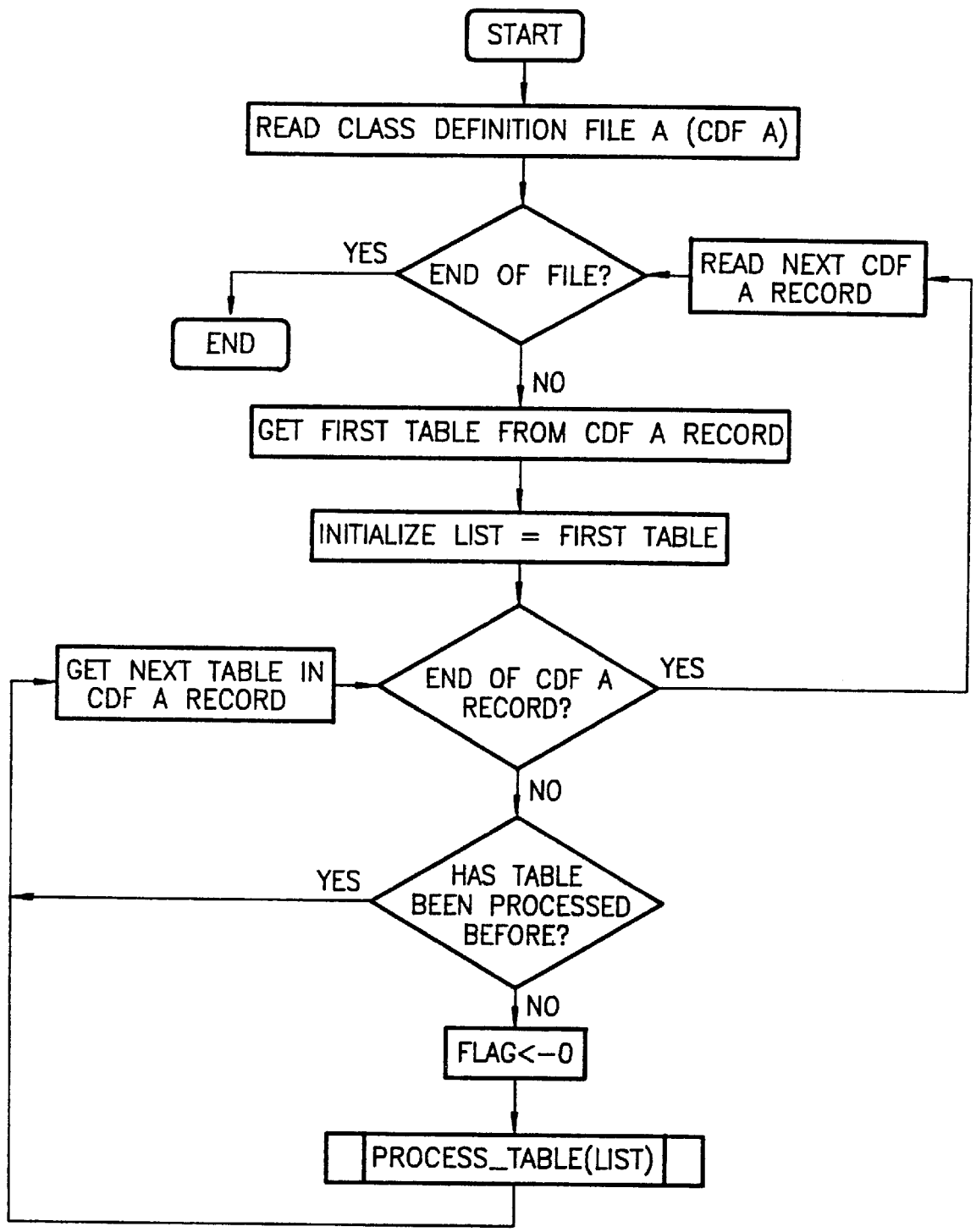
FIG. 8 is a main flowchart depicting one embodiment of procedure to generate Class Definition File B suitable for use in the step of derive Class Definition in the embodiment of FIG. 1.
Figures 1, 9A:
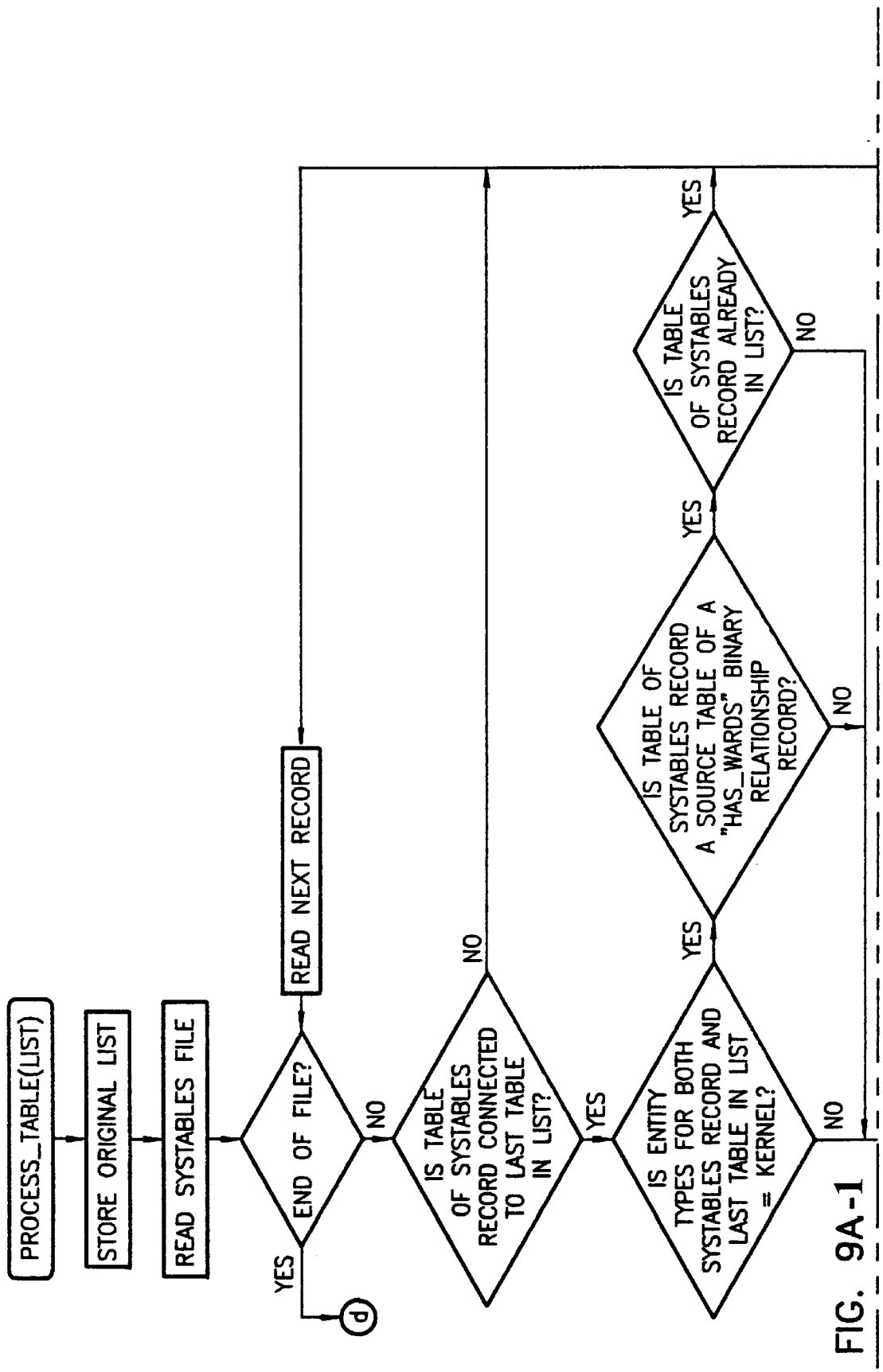
Figures 2, 9A:
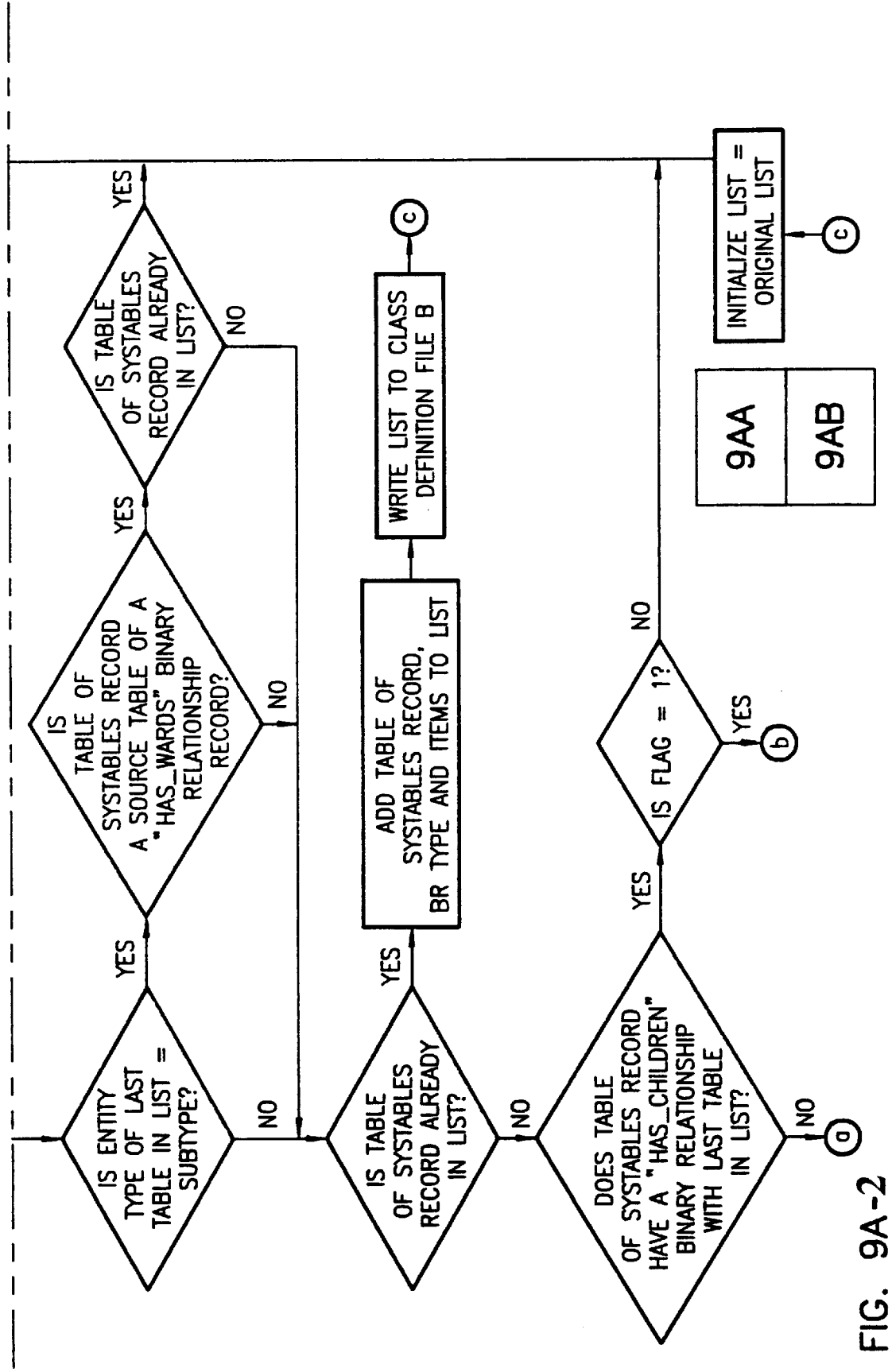

Let us describe how a list in CDF B is produced using this procedure of FIG. 8. It starts by reading in the first record of CDF A. A list is then initialized to the first table in this CDF A record. A check is made to see if this table has been processed before. Since it is not, the sub-procedure Process_Table as depicted in FIGS. 9A-1, 9A-2 and 9B are then called to look for a "lookup" table for this table. If there is such a table, it is added to the list together with the corresponding binary relationship type and the sub-procedure is called again. If no further "lookup" table can be found, the list is written to CDF B.

Let us now apply the above procedures on the personnel system below to generate the classes for this system.

| Table | Columns | Keys |
|---|---|---|
| EMPLOYEE | Emp_No | Primary key is Emp_No |
| | Emp_Name | |
| | Branch_No | Foreign key is Branch_No referencing BRANCH |
| | Race_Code | |
| | Address | |
| MANAGER | Emp_No | Primary key is Emp_No |
| | Co_Car_No | Foreign key is Emp_No referencing EMPLOYEE |
| NON_MANAGER | Emp_No | Primary key is Emp_No |
| | Union_M_No | Foreign key is Emp_No referencing EMPLOYEE |
| BRANCH | Branch_No | Primary key is Branch_No |
| | Branch_Name | |
| | Country_No | Foreign key is Country_No referencing COUNTRY |
| RACE_CODE | Race_Code | Primary key is Race_Code |
| | Race_Desc | |
| SKILLS | Emp_No | Primary key is Emp_No, Skill |
| | Skill | Foreign key is Emp_No referencing EMPLOYEE |
| PROJECT | Proj_No | Primary key is Proj_No |
| | Proj_Name | |
| | Cust_No | Foreign key is Cust_No referencing EMPLOYEE |
| BILLINGS | Emp_No | Primary key is Emp_No_Proj_No |
| | Proj_No | Foreign key is Emp_No referencing EMPLOYEE |
| | Month | Foreign key is Emp_No referencing PROJECT |
| | Amount | |
| CUSTOMER | Cust_No | Primary key is Cust_No |
| | Cust_Name | |
| EXPENSES | Branch_No | Primary key is Branch_No, Month |
| | Month | Foreign key is Branch_No referencing BRANCH |
| | Adv_Exp | |
| | Pers_Exp | |
| COUNTRY | Country_No | Primary key is Country_No |
| | Country_Name | |

Using Extract Application Semantics module 11 of FIG. 1, the following binary relationships are derived:

| Source Table | Source Column | Target Table | Target Column | Type |
|---|---|---|---|---|
| EMPLOYEE | Emp_No | SKILLS | Emp_No | has_children |
| EMPLOYEE | Emp_No | BILLINGS | Emp_No | has_children |
| EMPLOYEE | Emp_No | MANAGER | Emp_No | has_subtype |
| EMPLOYEE | Emp_No | NON_MANAGER | Emp_No | has_subtype |
| BRANCH | Branch_No | EMPLOYEE | Branch_No | has_ward |
| BRANCH | Branch_No | EXPENSES | Branch_No | has_children |
| COUNTRY | Country_No | BRANCH | Country_No | inv. of pure_lookup |
| RACE_CODE | Race_Code | EMPLOYEE | Race_Code | inv. of pure_lookup |
| PROJECT | Proj_No | BILLINGS | Proj_No | has_children |
| CUSTOMER | Cust_No | PROJECT | Cust_No | inv. of pure_lookup |

Also, the entity type of each table in SYSTABLES is as follows:

| Table | Entity Type | Short Name of Table |
|---|---|---|
| EMPLOYEE | Kernel | K1 |
| MANAGER | Subtype | S1 |
| NON-MANAGER | Subtype | S2 |
| BRANCH | Kernel | K2 |
| RACE_CODE | Pure Lookup | L1 |
| SKILLS | Characteristic | C1 |
| PROJECT | Kernel | K3 |
| BILLINGS | Associative | A1 |
| CUSTOMER | Pure Lookup | L2 |
| EXPENSES | Characteristic | C2 |
| COUNTRY | Pure Lookup | L3 |

Figure 6A:
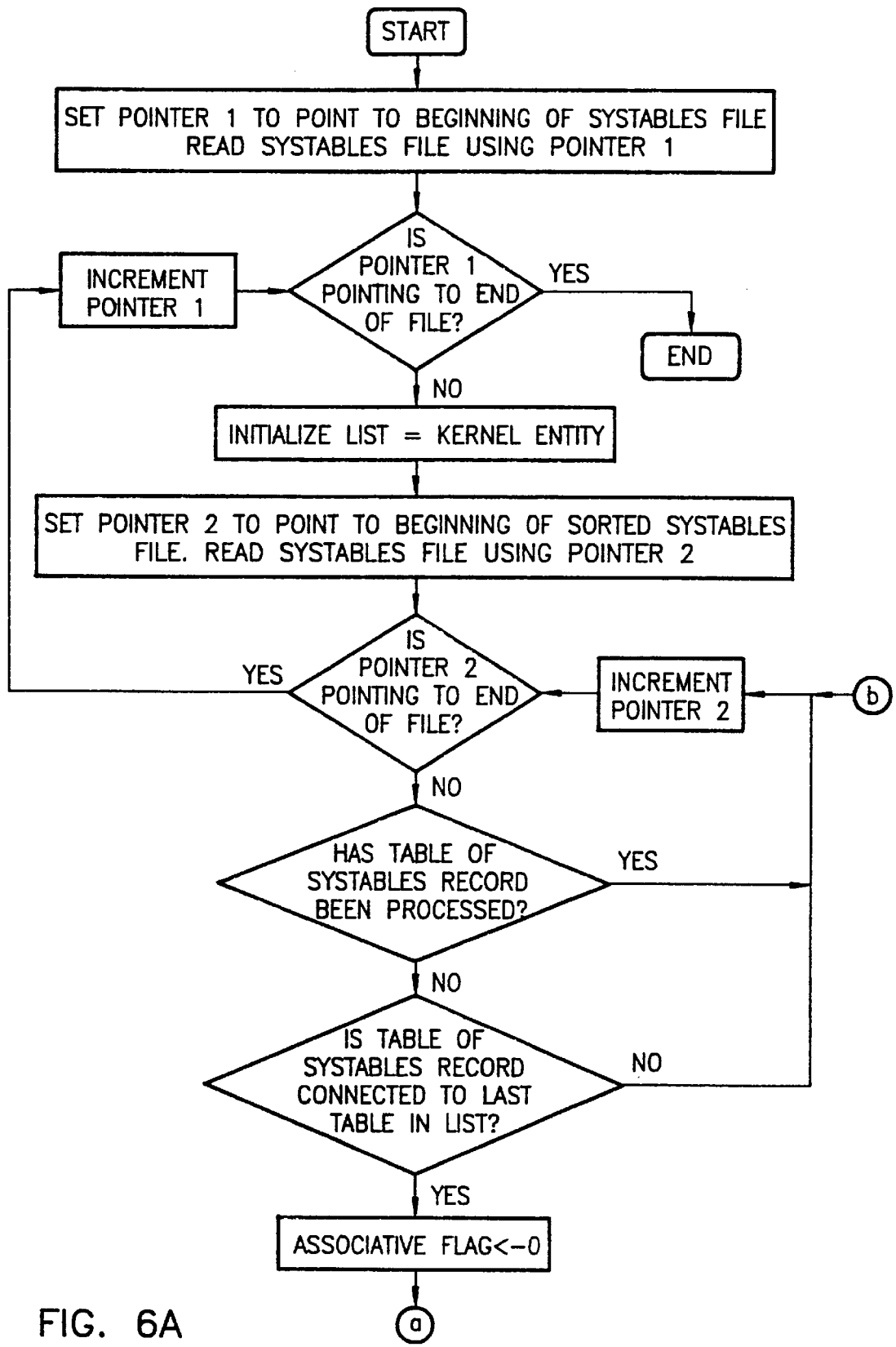
Figure 7A:
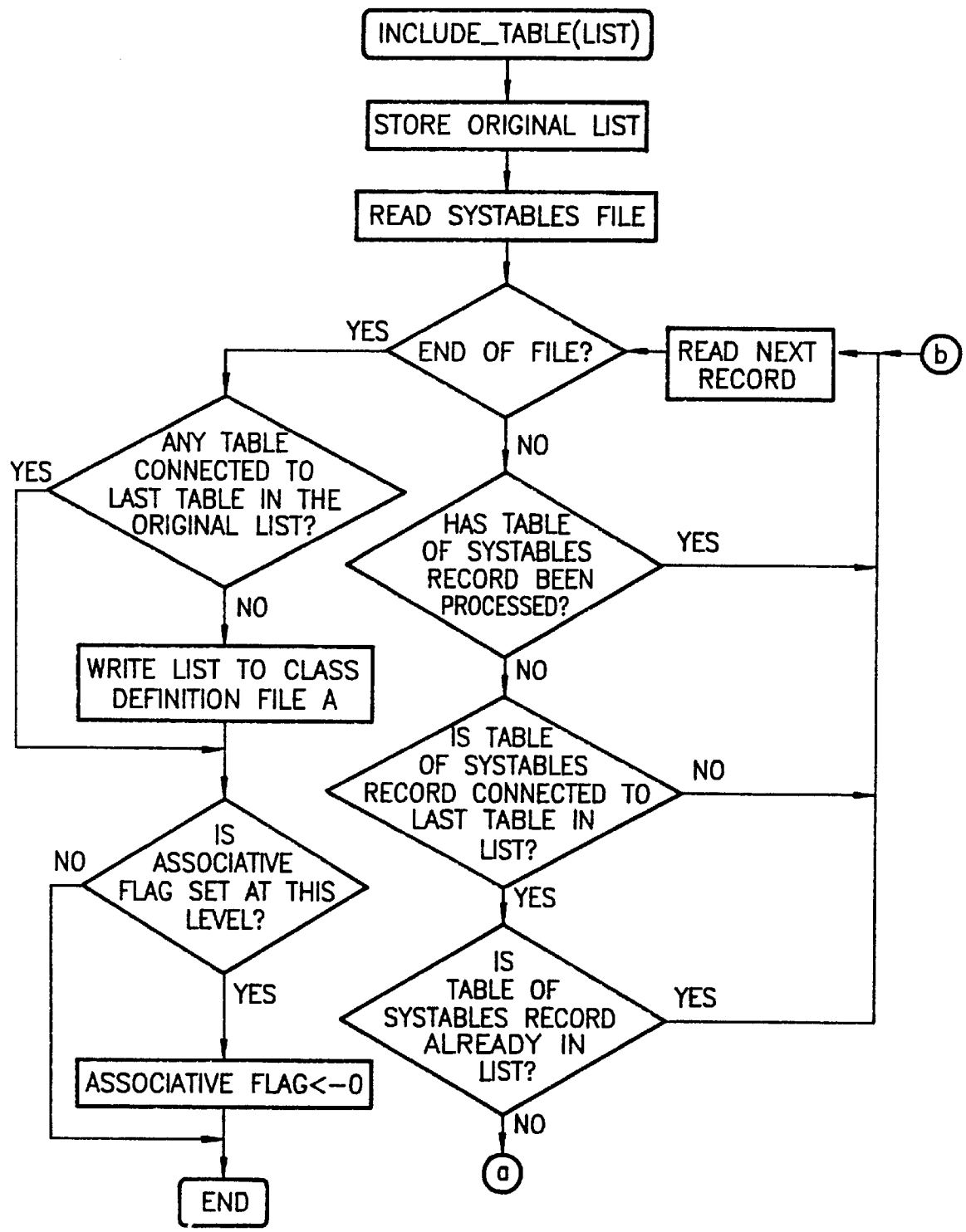
FIGS. 7a and 7b form a flow chart depicting one embodiment of the Include_Table procedure used by the procedure shown in FIG. 6b.
Figure 7B:
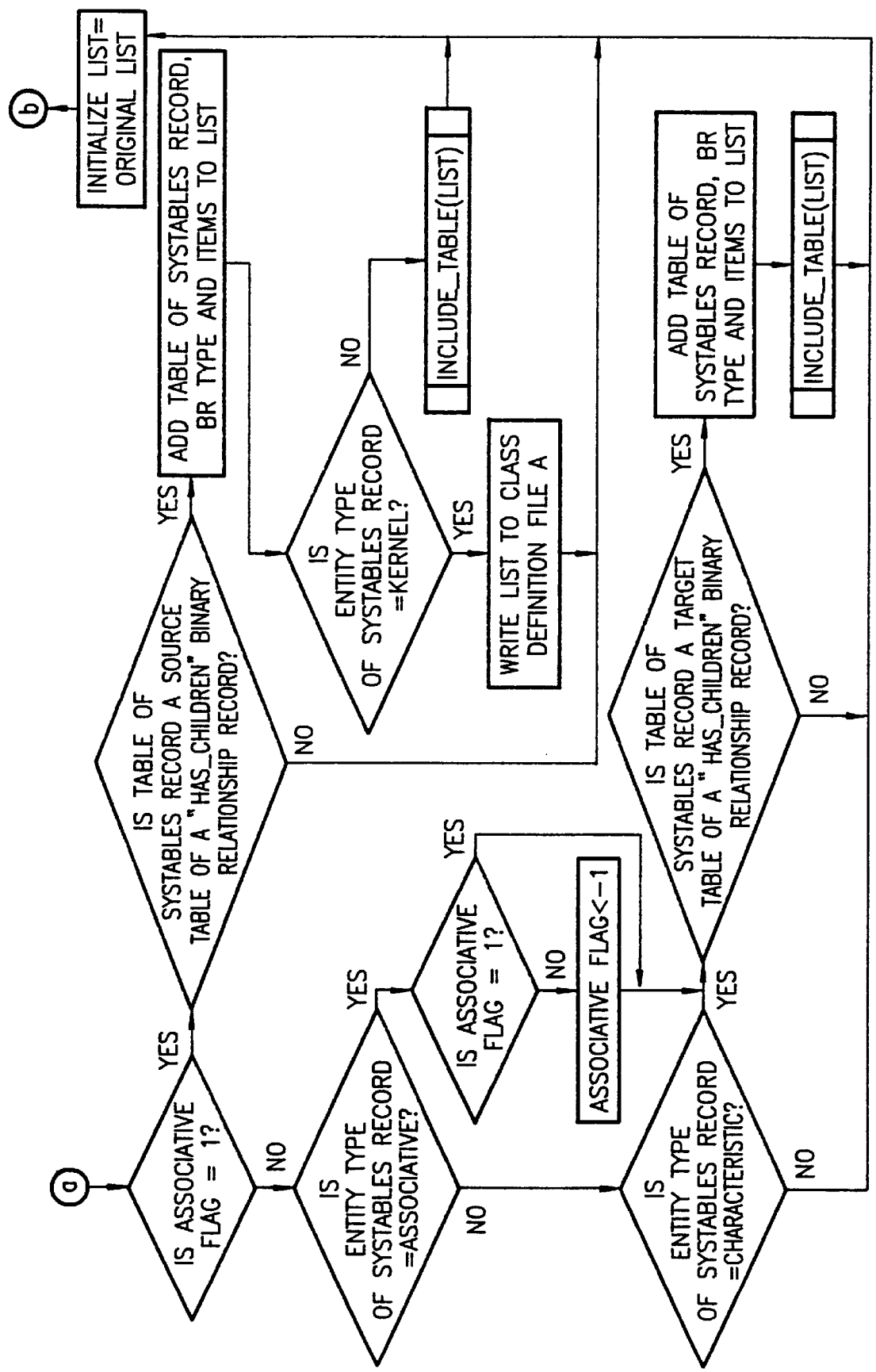

Let us first apply the exemplary procedure of FIGS. 6A, 6B-1 and 6B-2 on the personnel system example. As shown in FIG. 6a, it first initializes a list to the first kernel entity in the SYSTABLES, which is EMPLOYEE (K1). This means it is going to generate Class Definition File (CDF) A for the EMPLOYEE class. Next it uses a sorted SYSTABLES and Binary Relationship File 13 to find other entities to add to this list. The sorted SYSTABLES contains tables in descending order of subtypes, kernels, associatives, characteristics and pure lookups. The next entity added to the list is S1, which is MANAGER with the columns being Emp_No and the BR type being "has_subtype". This list is then written to CDF A.

The list is initialized again to K1 and S2 is added to it, with the columns being Emp_No and the BR type being "has_subtype", after which it is written to CDF A.

After the subtypes have been processed, the list K1 is initialized. The procedure then searches for those kernel entities that are "wards" of K1. However, in this example K1 has no "wards" and so there are no such entities to add to the list.

Next the procedure searches for associative entities of K1. K1 has one associative entity, namely BILLINGS (A1), so A1 is added to the list, with the columns being Emp_No and the BR type being "has_children". Next the procedure includes K3, which is PROJECTS, in this list since it constitutes the other entity that associates A1, with the columns being Proj_No and the BR type being "inverse_of_has_children". This list containing K1, A1, K3 is then written to CDF A.

After this, the procedure initializes the list to K1 again and search for characteristic entities of K1. K1 has one characteristic entity, namely SKILLS (C1), so C1 is added to the list, with the columns being Emp_No and the BR type being "has children". This list is written to CDF A.

At this point the CDF A contains the following lists a list having K1, S1 a list having K1, S2 a list having K1, A1, K3 a list having K1, C1

After this, the procedure generates the lists for the next kernel entity, namely BRANCHES (K2). K2 has no subtype and associative entities but it has K1 (EMPLOYEE) as its "ward". This produces the list K2, K1, with the columns being Branch_No and the BR type being "has_wards". This list is written to CDF A. K2 also has C2 (EXPENSES) as its characteristic entity. This produces the list K2, C2, with the columns being Branch_No and the BR type being "has_children". This list is also written to CDF A.

Finally, the list for the third and last kernel entity, namely PROJECTS (K3), is produced. However, there is only one list, namely a list having K3, A1, K1

Since PROJECT has an associative entity only, which is BRANCH (A), with K1 being the other entity that associates A1. In this list, the columns for K3 and A1 is Proj_No with BR type being "has_children". The columns for A1 and K1 is Emp_No with the BR type being "inverse_of_has_children".

Let us next apply the procedure of FIG. 8 on the personnel system. It uses the lists of CDF A derived earlier to generate the lists for CDF B. Using the same personnel system example, it first initializes a list to the first entity in the first list of CDF A, namely K1. It then adds to this list entities that are lookup entities to K1. A lookup entity is a target table in a "pure_lookup" or "inverse_of_has wards" binary relationships, with K1 as the source table. K1 looks up on BRANCH (K2), so K2 is added to the list, with the columns being Branch_No and the BR type being "inverse_of_has_wards". Next a check is made on K2 to see if it too has lookup entities. K2 in fact has one, namely COUNTRY (L3). L3 is therefore added to the list, with the columns being Country_No and the BR type being "pure_lookup". At this point the list contains K1, K2, L3. Since L3 has no lookup entities, this list is written to the CDF B. Next the procedure returns to K2 to see if K2 has other lookup entities. Since it does not, the procedure returns to K1. It finds that K1 has another lookup entity, namely RACE_CODE (L1). The list containing K1, L1, with the columns being Race_Code and the BR type being "pure_lookup" is then written to CDF B.

The next entity in the first list of CDF A is next processed. This entity is MANAGER (SI). It, however, does not have any lookup entities and so it is ignored.

As there is no further entities on the first list of CDF A, the first entity in the second list of CDF A is considered for processing. A check is made first to see if this entity has already been processed earlier. This entity is K1, which has been processed earlier, and so it is ignored. The next entity is S2 (NON_MANAGER) which has not been processed. However, it does not have any lookup entities, and so it is ignored.

The above procedure is again applied for the next list of CDF A, which contains K1, A1, K3. Since K1 has already been processed and A1 has no lookup entity, no list is produced for either of them. However, K3 (PROJECT) has a lookup entity, namely CUSTOMERS (L2). So the list K3, L2 is produced, with the columns being Cust_No and the BR type being "pure_lookup". It is then written to CDF B. The next list of CDF A is K1, C1. However, since K1 has already been processed and C1 (SKILLS) has no lookup entities, both are ignored.

The above procedure is applied to the remaining lists in CDF A. Only one list is produced, containing K2, L3, with the columns being Country_No and the BR type being "pure_lookup".

Besides CDF A and CDF B, the Class Definition File also includes CDF C. CDF C contains a single list which contains all the pure lookup entities.

The CDFC for the personnel system example contains L1, L2, L3.

Derive E-R Model Of Classes

The Derive E-R Model of classes module 16 of FIG. 1 is used to produce an Entity-Relationship (E-R) model for each class using CDF A and CDF B and Binary Relationships File 13. Many different embodiments of an E-R model can be produced.

The following describes a procedure to produce one embodiment of an entity-relationship (E-R) model of a class for all the classes except the class containing the pure lookup entities. This procedure begins by creating another file identical to SYSTABCOLS. This duplicate file is called TEMPTABCOLS. Next, for each "inverse_of_pure_lookup" binary relationships in Binary Relationship File 13, it inserts all the columns of the table used as source table in this binary relationship except those columns of the table that are used as source columns into this TEMPTABCOLS at the point which corresponds to the target columns of this binary relationship. Next, for each "has_children", "has_wards" or "has_subtype" type of binary relationships in Binary Relationship File 13, it deletes those columns in TEMPTABCOLS that are used as target columns in such binary relationships.

The procedure then gradually builds the E-R model for each class making use of the resultant TEMPTABCOLS. It first include all the columns of the root kernel entity of the class into the E-R model of the class. These columns are obtained from TEMPTABCOLS. Next it applies the following Decision Table 1 and 2 on the CDF A and CDF B of the class to determine the relationship names between two adjacent entities in the class which are not pure lookup entities.

Decision Table 1
To define relationship names between
two adjacent entities in the CDF A lists

| Rule | From Entity | To Entity | BR Type | Relationship Name |
|---|---|---|---|---|
| 1 | K | S | has_subtype | K is a S |
| 2 | K | S | has_wards | K has S |
| 3 | K | K' | has_wards | K has K' |
| 4 | X | C | has_children | X has C |
| 5 | X | A | has_children | a. X has Y<br>b. X and Y have A<br>(Y is another entity<br>that associates A) |

Decision Table 2
To define relationship names between
two adjacent entities in the CDF B lists

| Rule | From Entity | To Entity | BR Type | Relationship Name |
|---|---|---|---|---|
| 1 | X | C or A | inv_of_has_wards | X references C or A |
| 2 | K' | K | inv_of_has_wards | K' belongs to K |
| 3 | C or A | K' | inv_of_has_wards | C or A references K |
| 4 | C or A | K | inv_of_has_children | C or A belongs to K |

Legend:
X — kernel, subtype, characteristic, or associative entity
C — characteristic entity
A — associative entity
K,K' — kernel entities
Y — other entity that associates associative entity For each relationship name identified using the above Decision Tables, the relationship name and the columns of the table corresponding to the second entity of the two adjacent entities that establish this relationship name are included into the E-R model of the class. The columns included are obtained from TEMPTABCOLS. This E-R model is then stored in the E-R Model of Classes File 17.

Let us now apply this procedure on the personnel system example. At this stage we know that this personnel system has three classes which are derived from the root kernel entity of EMPLOYEE, BRANCH and PROJECT. We call these three classes:

ABOUT EMPLOYEE
ABOUT BRANCH
ABOUT PROJECT

If we were to apply the procedure we should get the following E-R models for the three classes:

---

ABOUT EMPLOYEE

Emp_No
    Emp_Name
    Race_Code
    Race_Desc
    Address
    <EMPLOYEE belongs to BRANCH>
        Branch_No
        Branch_Name
        Country_No
        Country_Name
    <EMPLOYEE is a MANAGER>
        Co_Car_No
    <EMPLOYEE is a NON_MANAGER>
        Union_M_No
    <EMPLOYEE has PROJECT>
        Proj_No
        Proj_Name
        Cust_No
        Cust_Name
    <EMPLOYEE and PROJECT have BILLINGS>
        Month
        Amount
    <EMPLOYEE has SKILLS>
        Skill

ABOUT BRANCH

Branch_No
    Branch_Name
    Country_No
    Country_Name
    <BRANCH has EMPLOYEE>
        Emp_No
        Emp_Name
        Address
        Race_Code
        Race_Desc
    <BRANCH has EXPENSES>
        Month
        Adv_Exp
        Pers_Exp

ABOUT PROJECT

Proj_No
    Proj_Name
    Cust_No
    Cust_Name
    <PROJECT has EMPLOYEE>
        Emp_No
        Emp_Name
        Race_Code
        Race_Desc
        Address
    <EMPLOYEE belongs to BRANCH>
        Branch_No
        Branch_Name
        Country_No
        Country_Name
    <PROJECT and EMPLOYEE have BILLINGS>
        Month
        Amount

---

Let us now explain how these E-R models are produced when the procedure is applied. First another file identical to SYSTABCOLS is created. This file is called TEMPTABCOLS. For each "inverse_of_pure_lookup" binary relationship in the Binary Relationship File 13, we insert in TEMPTABCOLS at the point where it corresponds to the target column all the columns of the source table except the source column itself, e.g., there is an "inverse_of_pure_lookup" binary relationship as follows.

| Source Table | Source Column | Target Table | Target Column |
|---|---|---|---|
| RACE_CODE | Race_Code | EMPLOYEE | Race_Code |

The columns of source table, namely RACE_CODE, are Race_Code and Race_Desc. The procedure inserts only the column Race_Desc (leaving out Race_Code as it corresponds to the source column) at Race_Code of EMPLOYEE of TEMPTABCOLS so that the columns of EMPLOYEE in TEMPTABCOLS become:

Emp_No
Emp_Name
Branch_Code
Race_Code
Race_Desc
Address

Next the procedure deletes those columns in TEMPTABCOLS that correspond to the target column in "has_children", "has_wards" and "has_subtype" binary relationships in Binary Relationship File 13. For example, Branch_No of EMPLOYEE in the personnel system is a target column in a "has_wards" binary relationship with BRANCH. This column in the TEMPTABCOLS file is deleted.

The resultant TEMPTABCOLS file is then used together with the following two decision tables earlier described to produce the above E-R model for each class which is then stored in the E-R For Classes File 17.

Let us show how the procedure produces the E-R model for the ABOUT EMPLOYEE class. First all columns of EMPLOYEE (K1) obtained from TEMPTABCOLS are included into the E-R model of this class. Next it reads CDF B to find records having K1 as the first table. The first such record is a list containing K1, K2, L3. The next table in this list is BRANCH (K2) which has a BR type of "inverse_of_has_wards" with EMPLOYEE (K1). As K1 and K2 are kernel entities with the BR type of "inverse_of_has_wards" the procedure applies rule 2 of Decision Table 2 to derive the following relationship name:

<EMPLOYEE belongs to BRANCH>

This relationship name together with the columns of BRANCH obtained from TEMPTABCOLS are then included into the E-R model of ABOUT EMPLOYEE.

The next table after K2 in the above CDF B record is L3. Since L3 is a pure lookup entity, the procedure ignores it and proceeds to read in the next record of CDF B having K1 as the first table. The record is a list containing K1, L1. However, since the next table in this list, namely RACE_CODE (L1) is a pure lookup entity, the procedure ignores it.

Because there are no more records in CDF B having K1 as the first table, the procedure starts to read the CDF A file. The first record of CDF A is a list containing K1, S1. Since S1 is a subtype entity with a BR type of "has_subtype" to K1, the procedure applies rule 1 of Decision Table 1 to derive the relationship name:

<EMPLOYEE is a MANAGER>

This relationship name together with the columns of MANAGER obtained from TEMPTABCOLS are then included in the E-R model of ABOUT EMPLOYEE class.

Next, the procedure reads the CDF B file to look for records containing S1 as the first table. However, there are no such records. It then proceeds to read in the next record of CDF A. This record contains K1, S2. Using the same rule as applied to S1 above, the procedure derives the following relationship name:

<EMPLOYEE is a NON-MANAGER>

This relationship name together with the columns of NON-MANAGER obtained from TEMPTABCOLS are then included in the E-R model of ABOUT EMPLOYEE class.

The procedure next reads the CDF B file to look for records containing S2 as the first table. However, there are no such records. It proceeds to read in the next record of CDF A. This record contains K1, A1, K3. Since A1 (BILLINGS) is an associative entity and K3 (PROJECTS) is the other entity that associates A1, the procedure first applies rule 5a of Decision Table 1 using K1 and K3 to derive the following relationship name:

<EMPLOYEE has PROJECTS>

This relationship name together with the columns of PROJECTS obtained from TEMPTABCOLS are then included in the E-R model of ABOUT EMPLOYEE class. Next the procedure reads CDF B file to look for records with K3 as the first table. There is one such record, namely K3, L2. However, since L2 (CUSTOMER) is a pure lookup entity, the record is ignored. The procedure then applies rule 5b of Decision Table 1 on the current CDF A record, namely the list containing K1, A1, K3, to derive the following relationship name:

<EMPLOYEE and PROJECT have BILLINGS>

This relationship name together with columns of BILLINGS obtained from TEMPTABCOLS are then included in the E-R model of ABOUT EMPLOYEE Class.

The procedure next reads the CDF B file to look for records with A1 as the first table. However, there is no such file. It then proceed read in the next CDF A record. This record contains K1, C1. Applying rule 4 of Decision Table 1, the procedure derives the following relationship name:

<EMPLOYEE has SKILLS>

This relationship name together with the columns of SKILLS obtained from the TEMPTABCOLS file are then included in the E-R model of ABOUT EMPLOYEE class.

The procedure next reads the CDF B file to look for records having C1 as the first table. However, there are none and so it proceeds to read the next CDF A record. However, there are no more CDF A records. This ends the E-R model translation for the ABOUT EMPLOYEE class from its class definition.

Besides the procedure just described, the E-R Model Translator also has another procedure which creates a class using CDF C to contain all the pure lookup entities. For the personnel system example, this procedure creates the following class:

ABOUT PURE LOOKUP ENTITIES

<RACE_CODE>
Race_Code

Race_Desc
<CUSTOMER>
Cust_No
Cust_Name
<COUNTRY>
Country_No
country_Name

This completes the description of the Derive E-R Model of Classes 16, step.

The invention now being fully described, it will be apparent to one of ordinary skill in the art that many changes and modifications can be made thereto without departing from the spirit or scope of the appended claims.

All publications and patent applications mentioned in this specification are herein incorporated by reference to the same extent as if each individual publication or patent application was specifically and individually indicated to be incorporated by reference.

What is claimed is:

1. A reverse engineering system for generating a logical data model from an application database having a plurality of database tables defined using a relational data model, comprising:
   a semantics extractor to derive a set of binary relationships and to derive an entity type for each said database table of said relational data model, said entity types classifying each said database table in accordance with a predefined criteria;
   a class generator for reading said set of binary relationships and said entity types, and for generating a set of classes, each class representing a select grouping of said database tables based on a classification scheme that utilizes said binary relationships and a particular entity type associated with each database table; and
   an entity-relationship (ER) model generator for generating one or more ER models, said ER models representing said logical data model.

2. A reverse engineering system as in claim 1 wherein said entity type is selected from a set of entity types which comprise a kernel entity type, a subtype entity type, a characteristic entity type, an associative entity type or a pure lookup entity type.

3. A reverse engineering system as in claim 2 wherein each said class is a tree having a root comprising a database table of kernel entity type and a plurality of branches each comprising a linkage of one or more database tables from said subset of database tables.

4. A reverse engineering system as in claim 1 wherein said binary relationship comprises a linkage between two tables in said relational data model in which one table has a repeating or foreign key that references the unique or primary key of the other table.

5. A reverse engineering system as in claim 4 wherein said set of binary relationship comprises "has_children", "has_wards", "inverse_of_pure_lookup" or "has_subtype" binary relationships.

6. A reverse engineering system as in claim 5 wherein said set of binary relationships further comprises "inverse_of_has_children", "inverse_of_has_wards", "pure_lookup" or "inverse_of_has_subtype" binary relationships.

7. A reverse engineering system as in claim 5 wherein said "has_children" binary relationship is one in which the source table is not a pure lookup entity type and has a one-to-many relationship with the target table, and the target table does not have its own independent unique or primary key.

8. A reverse engineering system as in claim 6 wherein said "inverse_of_has_children" binary relationship is one in which the target table is not a pure_lookup entity type and has a one-to-many relationship with the source table, and the source table does not have its own independent unique or primary key.

9. A reverse engineering system as in claim 5 wherein said "has_wards" binary relationship is one in which its source table is not a pure lookup entity type and has a one-to-many relationship with its target table, and its target table has its own independent unique key or primary key.

10. A reverse engineering system as in claim 6 wherein said "inverse_of_has_wards" binary relationship is one which the target table is not a pure lookup entity type and has a one-to-many relationship with the source table, and the source table has its own independent unique or primary key.

11. A reverse engineering system as in claim 5 wherein said "has_subtype" binary relationship is one in which its source table has a one-to-one relationship with its target table and the target table is a subtype entity of the source table.

12. A reverse engineering system as in claim 6 wherein said "inverse_of_has_subtype" binary relationship is one in which its target table has a one-to-one relationship with its source table and the source table is a subtype entity of the target table.

13. A reverse engineering system as in claim 5 wherein said "inverse_of_pure_lookup" binary relationship is a binary relationship whose source table is a pure_lookup entity.

14. A reverse engineering system as in claim 6 wherein said "pure_lookup" binary relationship is a binary relationship whose target table is a pure lookup entity.

15. A reverse engineering system as in claim 3 wherein said class further comprises a set of relationship names each of which specifies the nature of the relationship between two adjacent database tables in each branch of said tree of said class.

16. A reverse engineering system as in claim 15 wherein said class generator further comprises a means for a user to modify said relationship names in said set of classes.

17. A reverse engineering method for generating a logical data model from an application database having a plurality of database tables defined using a relational data model, comprising the steps of:
   reading said relational data model;
   deriving a set of binary relationships from said relational data model;
   identifying an entity type of each database table of said relational data model, said entity types classifying each said database table in accordance with a predefined criteria;
   generating a set of classes of said application database using said set of binary relationships and said identified entity types; and
   providing one or more ER models, each ER model associated with one or more of said classes, said ER models representing said logical data model.

18. A reverse engineering method as in claim 17 wherein each said class is a tree having a root comprising a database table of kernel entity type and a plurality of branches each comprising a linkage of one or more database tables from said subset of database tables.

19. A reverse engineering method as in claim 17 wherein said entity type is selected from a set of entity types which comprise a kernel entity type, a subtype entity type, a characteristic entity type, an associative entity type or a pure lookup entity type.

20. A reverse engineering method as in claim 17 wherein said binary relationship comprises a linkage between two tables in said relational data model in which one table has a repeating or foreign key that references the unique or primary key of the other table.

21. A reverse engineering method as in claim 20 wherein said set of binary relationships comprises "has_children", "has_wards", "inverse_of_pure_lookup" or "has_subtype" binary relationships.

22. A reverse engineering method as in claim 21 wherein said set of binary relationships further comprises "inverse_of_has_children", "inverse_of_has_wards", "pure_lookup" or "inverse_of_has-subtype" binary relationships.

23. A reverse engineering method as in claim 21 wherein said "has_children" binary relationship is one in which the source table is not a pure lookup entity type and has a one-to-many relationship with the target table, and the target table does not have its own independent unique or primary key.

24. A reverse engineering method as in claim 22 wherein said "inverse_of_has_children" binary relationship is one in which the target table is not a pure_lookup entity type and has a one-to-many relationship with the source table, and the source table does not have its own independent unique or primary key.

25. A reverse engineering method as in claim 21 wherein said "has_wards" binary relationship is one in which its source table is not a pure lookup entity type and has a one-to-many relationship with its target table, and its target table has its own independent unique key or primary key.

26. A reverse engineering method as in claim 22 wherein said "inverse_of_has_wards", binary relationship is one which the target table is not a pure lookup entity type and has a one-to-many relationship with the source table, and the source table has its own independent unique or primary key.

27. A reverse engineering method as in claim 21 wherein said "has_subtype" binary relationship is one which its source table has a one-to-one relationship with its target table and the target table is a subtype entity of the source table.

28. A reverse engineering method as in claim 22 wherein said "inverse_of_has_subtype" binary relationship is one in which its target table has a one-to-one relationship with its source table and the source table is a subtype entity of the target table.

29. A reverse engineering method as in claim 21 wherein said "inverse_of_pure_lookup" binary relationship is a binary relationship whose source table is a pure_lookup entity.

30. A reverse engineering method as in claim 22 wherein said pure_lookup" binary relationship is a binary relationship whose target table is a pure lookup entity.

31. A reverse engineering method as in claim 18 wherein said class further comprises a set of relationship names each of which specifies the nature of the relationship between two adjacent database tables in each branch of said tree of said class.

32. A reverse engineering method as in claim 31 which further comprises the step of modifying said relationship names in said set of classes.

33. A reverse engineering system as in claim 1 which further comprises a model purifier to alter said relational data model.

34. A reverse engineering method as in claim 17 which further comprises the step of altering said relational data model.

* * * * *